(12) United States Patent
Tanaka et al.

(10) Patent No.: US 8,942,584 B2
(45) Date of Patent: Jan. 27, 2015

(54) IMAGE FORMING APPARATUS AND IMAGE FORMING METHOD

(75) Inventors: Kayoko Tanaka, Tokyo (JP); Kohta Fujimori, Kanagawa (JP); Keita Sone, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 223 days.

(21) Appl. No.: 13/453,253

(22) Filed: Apr. 23, 2012

(65) Prior Publication Data

US 2012/0294637 A1 Nov. 22, 2012

(30) Foreign Application Priority Data

May 19, 2011 (JP) ................................ 2011-112719

(51) Int. Cl.
*G03G 15/00* (2006.01)
*G03G 15/01* (2006.01)

(52) U.S. Cl.
CPC ........ *G03G 15/5054* (2013.01); *G03G 15/0189* (2013.01); *G03G 2215/0161* (2013.01); *G03G 15/0115* (2013.01); *G03G 15/5058* (2013.01); *G03G 2215/0132* (2013.01); *G03G 2215/0164* (2013.01); *G03G 15/0131* (2013.01)
USPC .............................................. 399/49; 399/72

(58) Field of Classification Search
USPC ..................................................... 399/49, 72
See application file for complete search history.

(56) References Cited

U.S. PATENT DOCUMENTS

| | | | |
|---|---|---|---|
| 5,630,195 A | 5/1997 | Sawayama et al. | |
| 5,761,570 A | 6/1998 | Sawayama et al. | |
| 5,860,038 A | 1/1999 | Kato et al. | |
| 6,055,386 A | 4/2000 | Kato et al. | |
| 6,160,569 A | 12/2000 | Fujimori et al. | |

(Continued)

FOREIGN PATENT DOCUMENTS

| | | |
|---|---|---|
| CN | 1493930 A | 5/2004 |
| CN | 1694012 A | 11/2005 |

(Continued)

OTHER PUBLICATIONS

Extended Search Report issued Oct. 30, 2013 in Patent Application No. 12165768.8.

(Continued)

*Primary Examiner* — Francis Gray
(74) *Attorney, Agent, or Firm* — Oblon, Spivak, McClelland, Maier & Neustadt, L.L.P.

(57) ABSTRACT

In an image forming apparatus, a processor performs: a solid density stabilization of adjusting, in accordance with detected toner adhesion amounts of solid toner images of solid tone patterns, a condition to form solid images with respective target image densities; a misregistration reduction of adjusting, in accordance with detection timing of position detection toner images of misregistration detection patterns, a condition to reduce misregistration of toner images; and a halftone density stabilization of adjusting, in accordance with detected toner adhesion amounts of area coverage modulation toner images, a condition to form halftone images with respective target image densities. The processor continuously performs the solid density stabilization and the misregistration reduction, and starts the halftone density stabilization when the solid density stabilization is completed and the misregistration reduction is not completed, to concurrently perform a step of the misregistration reduction and at least a step of the halftone density stabilization.

8 Claims, 7 Drawing Sheets

(56) References Cited

U.S. PATENT DOCUMENTS

| | | | |
|---|---|---|---|
| 6,496,677 B2 | 12/2002 | Fujimori | |
| 6,665,511 B2 * | 12/2003 | Takeuchi et al. | 399/267 |
| 7,228,081 B2 | 6/2007 | Hasegawa et al. | |
| 7,251,420 B2 | 7/2007 | Fujimori et al. | |
| 7,260,335 B2 | 8/2007 | Kato et al. | |
| 7,515,844 B2 | 4/2009 | Tanaka et al. | |
| 7,551,864 B2 | 6/2009 | Fujimori et al. | |
| 7,551,866 B2 | 6/2009 | Watanabe et al. | |
| 7,573,613 B2 * | 8/2009 | Takemoto et al. | 358/3.01 |
| 7,655,936 B2 | 2/2010 | Sawayama et al. | |
| 7,672,602 B2 | 3/2010 | Ariizumi et al. | |
| 7,747,182 B2 | 6/2010 | Kato et al. | |
| 7,809,291 B2 | 10/2010 | Takeuchi et al. | |
| 7,821,677 B2 | 10/2010 | Tanaka et al. | |
| 7,881,629 B2 | 2/2011 | Takeuchi et al. | |
| 7,929,873 B2 | 4/2011 | Takeuchi et al. | |
| 8,027,605 B2 | 9/2011 | Takeuchi et al. | |
| 8,045,874 B2 | 10/2011 | Yoshida et al. | |
| 8,095,025 B2 | 1/2012 | Ishibashi et al. | |
| 8,099,006 B2 | 1/2012 | Fujimori et al. | |
| 8,155,543 B2 | 4/2012 | Ishibashi et al. | |
| 2004/0251435 A1 | 12/2004 | Sawayama et al. | |
| 2005/0243342 A1 | 11/2005 | Abramsohn | |
| 2008/0145078 A1 | 6/2008 | Tomita et al. | |
| 2008/0292338 A1 * | 11/2008 | Fujiwara | 399/44 |
| 2009/0238591 A1 * | 9/2009 | Watanabe et al. | 399/51 |
| 2009/0324267 A1 | 12/2009 | Yoshida et al. | |
| 2010/0226664 A1 | 9/2010 | Yoshida et al. | |
| 2011/0020022 A1 * | 1/2011 | Obara et al. | 399/53 |

FOREIGN PATENT DOCUMENTS

| | | |
|---|---|---|
| CN | 101075104 A | 11/2007 |
| CN | 101539746 A | 9/2009 |
| JP | 3-208681 | 9/1991 |
| JP | 2005-173253 | 6/2005 |
| JP | 2006-17911 | 1/2006 |
| JP | 2006-47941 | 2/2006 |
| JP | 2006-139180 | 6/2006 |
| JP | 2006-349808 | 12/2006 |
| JP | 2009-300525 | 12/2009 |
| JP | 2010-266682 | 11/2010 |

OTHER PUBLICATIONS

Office Action issued Jul. 15, 2014 in Chinese Patent Application No. 201210158921.1.

* cited by examiner

IMAGE FORMING APPARATUS AND IMAGE FORMING METHOD

CROSS-REFERENCE TO RELATED APPLICATION

This patent application is based on and claims priority pursuant to 35 U.S.C. §119 to Japanese Patent Application No. 2011-112719, filed on May 19, 2011, in the Japan Patent Office, the entire disclosure of which is hereby incorporated by reference herein.

FIELD OF THE INVENTION

The present invention relates to an image forming apparatus and an image forming method performing a halftone density stabilization process in addition to a solid density stabilization process and a misregistration reduction process.

BACKGROUND OF THE INVENTION

There are tandem-type image forming apparatuses, in which toner images of yellow, magenta, cyan, and black (hereinafter referred to as Y, M, C, and K, respectively) colors are formed on image carrying members, e.g., photoconductors and subsequently superimposed and transferred onto either a belt member or a recording sheet on the belt member.

In the tandem-type image forming apparatus, owing to, for example, a change in temperature causing a slight change in position of an optical path of an optical system performing optical writing of latent images on the image carrying members, there can arise relative differences in latent image forming position among the four image carrying members for the Y, M, C, and K colors and resultant misregistration of the toner images of the respective colors. The misregistration of the toner images of the respective colors can also caused by a change in linear velocity of the four image carrying members and the belt member due to a variety of factors. The background image forming apparatus, therefore, performs a misregistration reduction process at a predetermined time, such as immediately after power-on and every time a predetermined number of sheets are printed. In the misregistration reduction process, respective position detection toner images formed on the image carrying members for the Y, M, C, and K colors are first transferred in a line onto the surface of the belt member to form misregistration detection patterns. Relative misregistration amounts of the position detection toner images of the respective colors are then detected on the basis of the timing of detection by reflective optical sensors of the position detection toner images of the respective colors in the misregistration detection patterns. Then, on the basis of the detection result, an image forming condition, such as the latent image writing start time, the face inclination angle of a reflecting mirror of the optical system, and the drive velocity change pattern of the image carrying members or the belt member, is adjusted to reduce the misregistration of the toner images of the respective colors.

The background image forming apparatus is configured to perform a solid density stabilization process in addition to the above-described misregistration reduction process. The solid density stabilization process is performed for the following reason. That is, in an electrophotographic image forming apparatus, if any of toners and a variety of members in the image forming apparatus undergoes a change in characteristics in accordance with a change in environment, such as temperature and humidity, there arises a change in toner adhesion amount per unit area of an output toner image and a resultant change in image density. Therefore, the solid density stabilization process is regularly performed to stabilize the image density of a solid image. In the solid density stabilization process, solid tone patterns each including a plurality of solid toner images different from one another in toner adhesion amount per unit area are first formed on the respective surfaces of the image carrying members for the Y, M, C, and K colors, and subsequently transferred in a line onto the surface of the belt member. In each of the solid tone patterns of the Y, M, C, and K colors transferred to the surface of the belt member, the toner adhesion amounts of the plurality of solid toner images are then detected by the reflective optical sensors. Then, one or more image forming conditions, such as the development potential and the intensity of latent image writing light, is adjusted on the basis of the detection results, to thereby form a solid image with a target image density.

Meanwhile, an image forming apparatus expressing a variety of tones by reproducing halftone in accordance with area coverage modulation has been widely used in recent years. In an image forming apparatus of this type, even if the image density of the solid image is stabilized by the solid density stabilization process, the image density of a halftone image according to area coverage modulation may be changed. This is because the image forming conditions, such as the development bias, for adjusting the toner adhesion amount per unit area of the solid image to a predetermined value are not necessarily the same as the image forming conditions for adjusting the toner adhesion amount per unit area of the halftone image according to area coverage modulation to a predetermined value.

In view of the above, another background image forming apparatus performs, separately from the solid density stabilization process, a halftone density stabilization process for stabilizing the image density of the halftone image according to area coverage modulation. The background image forming apparatus first performs the solid density stabilization process to adjust the development bias to a value providing a target image density. With the use of a reflective optical sensor, the background image forming apparatus then detects the toner adhesion amount of an area coverage modulation toner image of a halftone density formed under the adjusted development bias condition, and adjusts the image area ratio of the halftone image on the basis of the detection result to obtain a target halftone density. According to this configuration, the target image density is stably obtained in both the solid image and the halftone image. If the solid density stabilization process is performed after the halftone density stabilization process, the image density of the halftone image adjusted to the target image density deviates from the target image density owing to the change in, for example, the development bias. It is therefore desirable to perform the halftone density stabilization process after the solid density stabilization process, as in the above-described background image forming apparatus.

The above-described background image forming apparatus forms only single-color images. Also in a tandem-type image forming apparatus forming color images, it is desirable to perform the halftone density stabilization process for respective colors to improve the image quality. However, if the halftone density stabilization process starts after the completion of the solid density stabilization process, as in the above-described background image forming apparatus, the down-time of the image forming apparatus is substantially extended. After the start of the solid density stabilization process, therefore, it is desired to perform at least an early-stage step of the halftone density stabilization process concurrently with the solid density stabilization process, to thereby minimize an increase in down-time.

However, it has been found difficult to minimize the increase in down-time in the above-described manner. Specifically, the above-described area coverage modulation toner image is formed at an early stage of the halftone density stabilization process. To perform an early-stage step of the halftone density stabilization process concurrently with the solid density stabilization process, at least a latent image forming step of the area coverage modulation toner image should be performed concurrently with a step of the solid density stabilization process. As described above, however, it is desirable that the latent image of the area coverage modulation toner image be formed under the image forming condition adjusted by the solid density stabilization process. This configuration, therefore, allows the halftone density stabilization process to start only after the completion of the solid density stabilization process, and presents an obstacle to the minimization of the increase in down-time.

SUMMARY OF THE INVENTION

The present invention describes a novel image forming apparatus. In one example, a novel image forming apparatus includes an image forming device, a plurality of image carrying members, a transfer device, a toner image detector, and a processor. The image forming device is configured to form toner images. The image carrying members are configured to carry the toner images formed on respective rotating surfaces thereof. The transfer device includes an endless belt member, and is configured to superimpose and transfer the toner images onto a rotating surface of the belt member and then onto a recording medium or superimpose and transfer the toner images onto a recording medium carried on the rotating surface of the belt member. The toner image detector is configured to detect a toner image on the surface of the belt member and detect a toner adhesion amount per unit area of the toner image. The processor is configured to perform a solid density stabilization process of forming solid tone patterns, each of which includes a plurality of solid toner images different from one another in toner adhesion amount per unit area, on the image carrying members, transferring the solid tone patterns onto the surface of the belt member, and adjusting, on the basis of the result of detection by the toner image detector of the toner adhesion amounts per unit area of the solid toner images included in each of the solid tone patterns, an image forming condition of the image forming device to form solid images on the image carrying members with respective target image densities. The processor is configured to further perform a misregistration reduction process of forming position detection toner images on the image carrying members, transferring the position detection toner images onto the surface of the belt member to obtain misregistration detection patterns, and adjusting, on the basis of the timing of detection by the toner image detector of the position detection toner images included in each of the misregistration detection patterns, an image forming condition of the image forming device to reduce relative misregistration of the toner images among the image carrying members. The processor device is configured to further perform a halftone density stabilization process of forming area coverage modulation toner images on the image carrying members, transferring the area coverage modulation toner images onto the surface of the belt member, and adjusting, on the basis of the result of detection by the toner image detector of the toner adhesion amounts per unit area of the area coverage modulation toner images, an image forming condition of the image forming device to form halftone images on the image carrying members with respective target image densities. The processor continuously performs the solid density stabilization process and the misregistration reduction process, and starts the halftone density stabilization process at a time at which the solid density stabilization process has been completed and the misregistration reduction process has not been completed, to thereby concurrently perform a step of the misregistration reduction process and at least a step of the halftone density stabilization process.

The processor may start the misregistration reduction process before the completion of the solid density stabilization process to concurrently perform a step of the solid density stabilization process and a step of the misregistration reduction process.

When concurrently performing a step of the solid density stabilization process and a step of the misregistration reduction process, the processor may continuously perform the formation of the solid tone patterns and the formation of the misregistration detection patterns. Further, when concurrently performing a step of the misregistration reduction process and at least a step of the halftone density stabilization process, the processor continuously may perform the formation of the misregistration detection patterns and the formation of the area coverage modulation toner images.

The processor may perform the solid density stabilization process, the misregistration reduction process, and the halftone density stabilization process by driving the belt member at the same linear velocity.

The image carrying members may be disposed at an equal pitch, and each of the solid tone patterns may have a length less than the pitch in the moving direction of the belt member.

In the halftone density stabilization process, the processor may form halftone patterns each including the area coverage modulation toner images different from one another in image area ratio, with each of the halftone patterns formed in a length less than the pitch in the moving direction of the belt member, and may calculate, on the basis of the result of detection of the toner adhesion amounts per unit area of the area coverage modulation toner images, an image forming condition which adjusts a plurality of halftone density levels to respective target densities.

The processor may cause the toner image detector to detect the toner adhesion amounts per unit area of the solid toner images of the solid tone patterns and the toner adhesion amounts per unit area of the area coverage modulation toner images under the same operation condition of the toner image detector.

The processor may set the operation condition of the toner image detector for detecting the position detection toner images of the misregistration detection patterns to be the same as the operation condition of the toner image detector for detecting the toner adhesion amounts per unit area of the solid toner images and the toner adhesion amounts per unit area of the area coverage modulation toner images.

The present invention further describes a novel image forming method. In one example, a novel image forming method forms toner images on respective rotating surfaces of a plurality of image carrying members, and superimposes and transfers the toner images onto a rotating surface of an endless belt member and then onto a recording medium or superimposes and transfers the toner images onto a recording medium carried on the rotating surface of the belt member. The image forming method includes: performing a solid density stabilization process of forming solid tone patterns, each of which includes a plurality of solid toner images different from one another in toner adhesion amount per unit area, on the image carrying members, transferring the solid tone patterns onto the surface of the belt member, detecting toner adhesion amounts per unit area of the solid toner images included in each of the solid tone patterns, and adjusting, on the basis of the result of the detection, an image forming condition to form solid images on the image carrying members with respective target image densities; performing a misregistration reduction process of forming position detection toner images on the image carrying members, transferring the position detection toner images onto the surface of the belt member to obtain misregistration detection patterns, detecting the position detection toner images included in each of the misregistration detection patterns, and adjusting, on the basis of the timing of the detection, an image forming condition to reduce relative misregistration of the toner images among the image carrying members, with the solid density stabilization process and the misregistration reduction process continuously performed; and performing a halftone density stabilization process of forming area coverage modulation toner images on the image carrying members, transferring the area coverage modulation toner images onto the surface of the belt member, detecting toner adhesion amounts per unit area of the area coverage modulation toner images, and adjusting, on the basis of the result of the detection, an image forming condition to form halftone images on the image carrying members with respective target image densities, with the halftone density stabilization process started at a time at which the solid density stabilization process has been completed and the misregistration reduction process has not been completed, to thereby concurrently perform a step of the misregistration reduction process and at least a step of the halftone density stabilization process.

BRIEF DESCRIPTION OF THE DRAWINGS

A more complete appreciation of the invention and many of the advantages thereof are obtained as the same becomes better understood by reference to the following detailed description when considered in connection with the accompanying drawings, wherein.

DETAILED DESCRIPTION OF THE INVENTION

Figure 1:
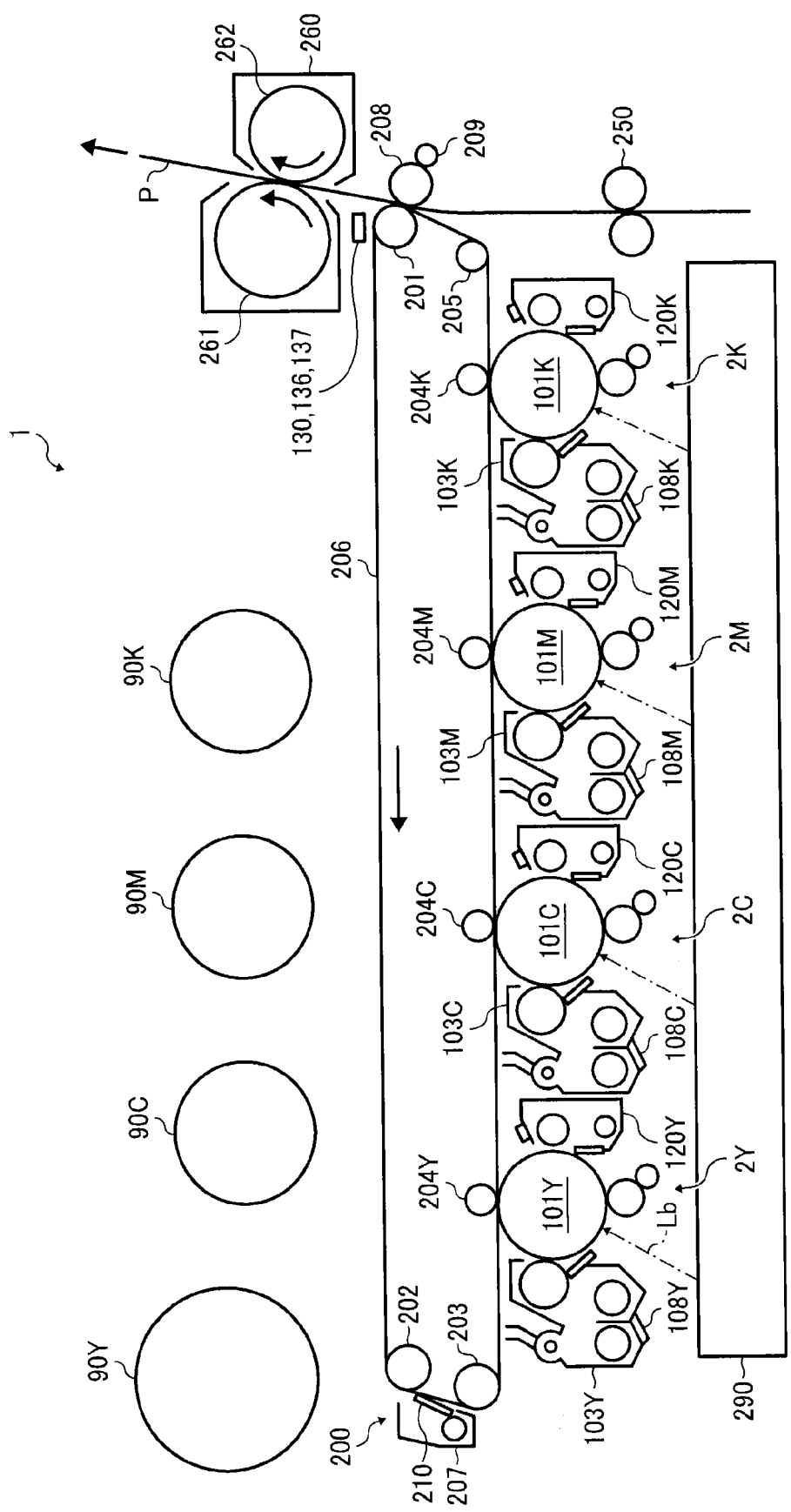
FIG. 1 is a schematic configuration diagram illustrating major components of a printer according to an embodiment.

In describing the embodiments illustrated in the drawings, specific terminology is adopted for the purpose of clarity. However, the disclosure of the present invention is not intended to be limited to the specific terminology so used, and it is to be understood that substitutions for each specific element can include any technical equivalents that operate in a similar manner.

Referring now to the drawings, wherein like reference numerals designate identical or corresponding parts throughout the several views, an electrophotographic printer 1 will be described as an image forming apparatus according to an embodiment of the present invention. FIG. 1 is a schematic configuration diagram illustrating major components of the printer 1 according to the embodiment.

The printer 1 includes, in addition to the configurations illustrated in FIG. 1, not-illustrated components, such as a print controller or processor for processing image data transmitted from, for example, a personal computer (hereinafter referred to as PC) and converting the image data into exposure data, a high-voltage generating device for generating a relatively high voltage, a later-described control unit 500 (see FIG. 5) for controlling an image forming operation, a sheet feeding device for supplying a recording sheet P serving as a recording medium, a manual feed tray from which a recording sheet P is manually fed, and a sheet discharge tray to which an image-formed recording sheet P is discharged.

In FIG. 1, a reference numeral 200 denotes a transfer unit serving as a transfer device. The transfer unit 200 includes a drive roller 201, a cleaning backup roller 202, a primary transfer nip entrance roller 203, four primary transfer rollers 204Y, 204C, 204M, and 204K, a secondary transfer nip entrance roller 205, an intermediate transfer belt 206, a belt cleaning device 207 including a cleaning blade 210, a secondary transfer roller 208, and a cleaning roller 209. As the drive roller 201 is driven to rotate, the endless intermediate transfer belt 206 serving as an endless belt member is rotated in the counterclockwise direction in FIG. 1, while being stretched by a plurality of rollers provided inside a loop of the intermediate transfer belt 206. Suffixes Y, C, M, and K following the reference numeral 204 denoting the four primary transfer rollers 204Y, 204C, 204M, and 204K indicate that the members attached with the suffixes are for yellow, cyan, magenta, and black colors. The same applies to the suffixes Y, C, M, and K following other reference numerals.

The intermediate transfer belt 206 has a three-layer structure including a belt base layer, an elastic layer, and a surface layer, with the elastic layer and the surface layer sequentially laminated on the outer surface of the belt base layer which is the thickest among the three layers. The belt base layer is made of, for example, a material combining a relatively inelastic fluorine-based resin, a substantially elastic rubber material, and a relatively non-stretchable material such as canvas. The elastic layer is made of, for example, a fluorine-based rubber or an acrylonitrile-butadiene copolymer rubber, and is laminated on the outer surface of the belt base layer. The surface layer is made of, for example, a fluorine-based resin applied to the outer surface of the elastic layer to coat the surface.

Below the transfer unit 200, four image forming units 2Y, 2C, 2M, and 2K for the Y, C, M, and K colors are provided in a line along a lower stretched surface of the intermediate transfer belt 206. The image forming units 2Y, 2C, 2M, and 2K include drum-like photoconductors 101Y, 101C, 101M, and 101K, development devices 103Y, 103C, 103M, and 103K, and drum cleaning devices 120Y, 120C, 120M, and 120K, respectively. The respective top portions of the outer circumferential surfaces of the photoconductors 101Y, 101C, 101M, and 101K are brought into contact with the lower stretched surface of the intermediate transfer belt 206 to from primary transfer nips for the Y, C, M, and K colors.

Above the transfer unit 200, toner bottles 90Y, 90C, 90M, and 90K for the Y, C, M, and K colors respectively containing not-illustrated Y, C, M, and K toners are provided in a line along an upper stretched surface of the intermediate transfer belt 206. The Y, C, M, and K toners contained in the toner bottles 90Y, 90C, 90M, and 90K are supplied to the development devices 103Y, 103C, 103M, and 103K, respectively, in accordance with driving of not-illustrated toner replenishing devices for the Y, C, M, and K colors. Each of the toner bottles 90Y, 90C, 90M, and 90K is individually attachable to and detachable from the body of the printer 1 serving as the image forming apparatus, and is replaced by a new toner bottle when running out of the toner contained therein.

Below the four image forming units 2Y, 2C, 2M, and 2K aligned along the lower stretched surface of the intermediate transfer belt 206, an optical writing unit 290 is provided. On the basis of image information, the optical writing unit 290 drives not-illustrated semiconductor lasers provided therein to emit writing light Lb for each of the Y, C, M, and K colors. With the writing light Lb, the optical writing unit 290 then optically scans the photoconductors 101Y, 101C, 101M, and 101K serving as latent image carrying members, and thereby writes electrostatic latent images on the outer circumferential surfaces of the photoconductors 101Y, 101C, 101M, and 101K driven to rotate in the clockwise direction in FIG. 1. The light sources of the writing light Lb are not limited to the semiconductor lasers, and may be light emitting diodes (LEDs), for example.

FIG. 1 further illustrates a Y toner concentration sensor 108Y, a C toner concentration sensor 108C, an M toner concentration sensor 108M, a K toner concentration sensor 108K, a registration roller pair 250, a fixing device 260 including a fixing roller 261 and a pressure roller 262, a first reflective optical sensor 130, a second reflective optical sensor 136, and a third reflective optical sensor 137, which will be described in detail later.

A configuration of the image forming units 2Y, 2C, 2M, and 2K will now be described with reference to the image forming unit 2K for the K color as an example. The image forming units 2Y, 2C, and 2M for the other colors of Y, C, and M are similar in configuration to the image forming unit 2K for the K color except for the difference in color of the toner used therein, and thus description thereof will be omitted.

Figure 2:
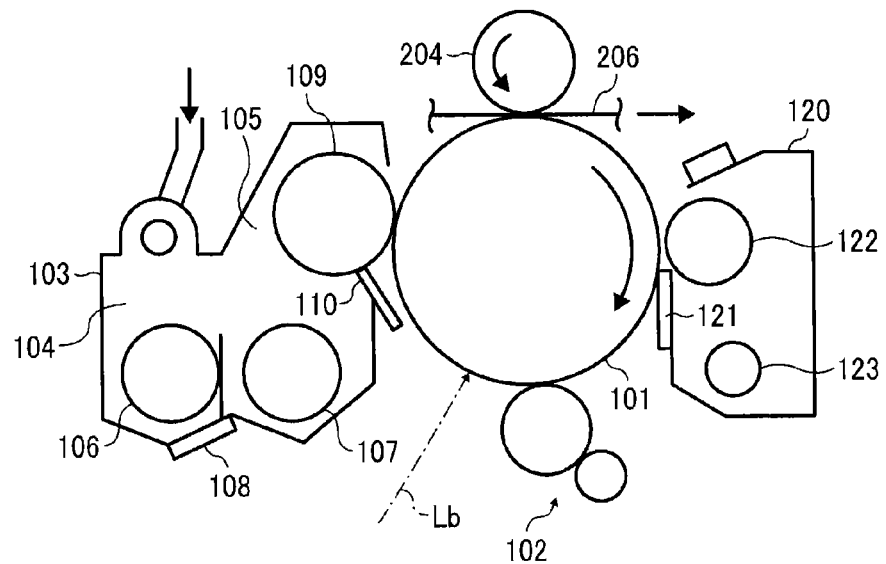
FIG. 2 is an enlarged configuration diagram illustrating an image forming unit for black color included in the printer.

FIG. 2 is an enlarged configuration diagram illustrating the image forming unit 2K for the K color. The suffix K, which is to follow a reference numeral denoting any of the members and devices forming the image forming unit 2K for the K color, is omitted in FIG. 2 for the sake of convenience. In the image forming unit 2K for the K color, the drum-like photoconductor 101 is surrounded by, for example, a charging device 102 for uniformly charging the photoconductor 101, a development device 103, and a drum cleaning device 120.

The charging device 102 is based on a contact charging method which brings a charge roller applied with a charging bias by a not-illustrated power supply into contact with the photoconductor 101. The charging device 102 uniformly charges the outer circumferential surface of the photoconductor 101 by causing discharge between the charge roller and the photoconductor 101. The contact charging method employing the charge roller may be replaced by a contact discharge method employing a charge brush or a non-contact charging method employing a scorotron charger.

The development device 103 has a casing housing a mixing section 104 for mixing a two-component developer containing not-illustrated magnetic carrier and non-magnetic toner and a development section 105 housing a later-described development sleeve 109. In the mixing section 104, the two-component developer (hereinafter simply referred to as the developer) is conveyed while being mixed. More specifically, the mixing section 104 includes a first screw member 106 and a second screw member 107 provided parallel to each other and a divider plate provided therebetween. The divider plate divides the space housing the first and second screw members 106 and 107 into two spaces. Opposite end portions of the divider plate in the axial direction of the first and second screw members 106 and 107 are respectively formed with openings. Thereby, the two spaces communicate with each other at the opposite end portions of the divider plate in the axial direction of the first and second screw members 106 and 107. Hereinafter, the space housing the first screw member 106 and the space housing the second screw member 107 will be referred to as the first mixing chamber and the second mixing chamber, respectively.

The second screw member 107 is located under the development section 105. The upper end side of the outer circumferential surface of the second screw member 107 faces the lower end side of the development sleeve 109 housed in the development section 105. The second screw member 107 is driven to rotate by a not-illustrated drive device, and conveys the developer in the second mixing chamber from the far side toward the near side in a direction perpendicular to the drawing plane. In this process, the second screw member 107 supplies the developer to the development sleeve 109 and receives the used developer from the development sleeve 109. The developer conveyed by the second screw member 107 to an end portion on the near side in FIG. 2 enters the first mixing chamber through the corresponding opening of the divider plate.

The first screw member 106 is driven to rotate by a not-illustrated drive device, and conveys the developer in the first mixing chamber from the near side toward the far side in the direction perpendicular to the drawing plane. A bottom wall of the first mixing chamber is fixed with a toner concentration sensor 108 which detects the toner concentration of the developer conveyed by the first screw member 106. The result of the detection is transmitted to the not-illustrated control unit 500 (see FIG. 5) as a toner concentration signal. The control unit 500 drives, as appropriate, the not-illustrated toner replenishing device for the K color on the basis of the toner concentration signal, to thereby replenish the first mixing chamber with an appropriate amount of toner. Thereby, the toner concentration of the developer, which has been reduced in accordance with the development performed in the development section 105, is increased. The developer conveyed by the first screw member 106 to an end portion on the far side in FIG. 2 enters the second mixing chamber through the other opening provided in the divider plate. Thereby, the developer in the development device 103 is circularly conveyed along a route from the first mixing chamber to the second mixing chamber, the development section 105, the second mixing chamber, and the first mixing chamber. Accordingly, the toner concentration is adjusted in the first mixing chamber.

The development section 105 includes the cylindrical development sleeve 109 driven to rotate by a not-illustrated drive device. A portion of the outer circumferential surface of the development sleeve 109 is exposed to the outside of the casing of the development device 103 through an opening provided in the casing. The exposed portion of the development sleeve 109 faces the photoconductor 101 via a minute development gap. Further, the development sleeve 109 houses a not-illustrated magnet roller in a hollow space thereof. The magnet roller is non-rotatably fixed so as not to rotate together with the development sleeve 109.

The developer conveyed by the second screw member 107 in the above-described second mixing chamber is attracted to and carried on the outer circumferential surface of the development sleeve 109 by magnetic force generated by the magnet roller. Then, as the developer passes a gap between the developer sleeve 109 and a regulation blade 110 in accordance with the rotation of the development sleeve 109, the thickness of the layer of the developer on the development sleeve 109 is regulated. Thereafter, the developer is conveyed to a development area facing the photoconductor 101.

The development sleeve 109 made of a non-magnetic material includes therein a not-illustrated development electrode applied with a development bias. In the development area, a development electric field is generated between the electrostatic latent image on the photoconductor 101 and the development sleeve 109. The developer conveyed to the development area is caused to stand up in spikes and form a magnetic brush by magnetic force generated by a not-illustrated development magnetic pole of the magnet roller, and the leading end of the magnetic brush is brought into sliding contact with the photoconductor 101. Then, the toner in the magnetic brush separates from the magnetic carrier owing to the action of the above-described development electric field, and is transferred to the electrostatic latent image on the photoconductor 101. With this transfer, the electrostatic latent image on the photoconductor 101 is developed into a toner image as a visible image.

When the developer passes the development area and reaches a position facing the second mixing chamber in accordance with the rotation of the development sleeve 109, the developer separates from the outer circumferential surface of the development sleeve 109 and falls into the second mixing chamber owing to the action of a repulsive magnetic field generated by two not-illustrated homopolar magnetic poles of the magnet roller.

Accordingly, the toner in the developer is transferred to the electrostatic latent image on the photoconductor 101, and the electrostatic latent image on the photoconductor 101 is visualized into a toner image. The developer having passed the development area is conveyed to an area in which the magnetic force of the magnet roller is relatively weak. Thereby, the developer separates from the development sleeve 109 and returns to the mixing section 104.

Although the above description has been given of the development device 103 employing the two-component development method using the two-component developer, a development device according to a one-component development method may be employed which uses a one-component developer not containing magnetic carrier but containing toner.

In accordance with the rotation of the photoconductor 101 in the clockwise direction in FIG. 2, the toner image formed on the outer circumferential surface of the photoconductor 101 serving as an image carrying member enters the primary transfer nip formed by the contact between the photoconductor 101 and the intermediate transfer belt 206, and is primary-transferred onto the outer circumferential surface of the intermediate transfer belt 206. The outer circumferential surface of the photoconductor 101 having passed the primary transfer nip reaches a position facing the drum cleaning device 120.

The drum cleaning device 120 includes a cleaning blade 121, a conductive fur brush 122, and a discharge screw 123. The cleaning blade 121 is made of, for example, polyurethane rubber, and has a leading end pressed against the photoconductor 101. A slight amount of post-transfer residual toner having failed to be transferred to the intermediate transfer belt 206 adheres to the outer circumferential surface of the photoconductor 101 having passed the above-described primary transfer nip. The post-transfer residual toner is scraped off the outer circumferential surface of the photoconductor 101 by the cleaning blade 121 and collected in the drum cleaning device 120.

The fur brush 122 rotates while in contact with the outer circumferential surface of the photoconductor 101 at a position immediately before the position of contact between the photoconductor 101 and the cleaning blade 121. The fur brush 122 also removes the post-transfer residual toner.

The toner removed from the photoconductor 101 by the cleaning blade 121 and the fur brush 122 is stored in the drum cleaning device 120, and is discharged outside the drum cleaning device 120 by the discharge screw 123. The discharged toner is then collected in a not-illustrated waste toner bottle.

In FIG. 1 described above, the outer circumferential surface of the photoconductor 101K is uniformly charged to, for example, approximately −700 V by the charging device 102K. The potential of the electrostatic latent image applied with the writing light Lb by the optical writing unit 290 is approximately −120 V, for example. Meanwhile, the development bias voltage applied to the development sleeve 109 in FIG. 2 is approximately −470 V, for example. Thereby, development potential of approximately 350 V, for example, is generated. Such an image forming condition is changed as appropriate by a later-described solid density stabilization process.

The primary transfer rollers 204Y, 204C, 204M, and 204K of the transfer unit 200 serving as primary transfer members are in contact with the inner circumferential surface of the intermediate transfer belt 206 at respective positions corresponding to the primary transfer nips for the Y, C, M, and K colors. Each of the primary transfer rollers 204Y, 204C, 204M, and 204K thus in contact with the inner circumferential surface of the intermediate transfer belt 206 is applied with a primary transfer bias by a not-illustrated power supply. In the primary transfer nips for the Y, C, M, and K colors, therefore, primary transfer electric fields are generated which electrostatically move the toner images on the photoconductors 101Y, 101C, 101M, and 101K from the outer circumferential surfaces of the photoconductors 101Y, 101C, 101M, and 101K toward the intermediate transfer belt 206. Although the present printer 1 employs the primary transfer rollers 204Y, 204C, 204M, and 204K as the devices for generating the primary transfer electric fields, conductive brush-like devices or non-contact corona chargers, for example, may be employed as the devices for generating the primary transfer electric fields.

The intermediate transfer belt 206 rotates and sequentially passes the primary transfer nips for the Y, C, M, and K colors. Thereby, the Y, C, M, and K toner images are sequentially superimposed and primary-transferred onto the outer circumferential surface of the intermediate transfer belt 206. Accordingly, a superimposed toner image including the superimposed Y, C, M, and K toner images is formed on the outer circumferential surface of the intermediate transfer belt 206 having passed the primary transfer nip for the K color.

The secondary transfer roller 208 provided outside the loop of the intermediate transfer belt 206 comes into contact with the outer circumferential surface of the intermediate transfer belt 206 such that the intermediate transfer belt 206 is sandwiched between the secondary transfer roller 208 and the drive roller 201 provided inside the loop. Thereby, a secondary transfer nip is formed. In the vicinity of the secondary transfer nip, the drive roller 201 is grounded. Meanwhile, the secondary transfer roller 208 is applied with a secondary transfer bias opposite in polarity to the toner. In the secondary transfer nip, therefore, a secondary transfer electric field is generated which electrostatically moves the toner from the outer circumferential surface of the intermediate transfer belt 206 toward the secondary transfer roller 208 serving as a secondary transfer member.

The present printer 1 includes a not-illustrated sheet feeding cassette which stores a sheet bundle of a plurality of recording sheets P stacked in the thickness direction. The uppermost recording sheet P of the sheet bundle is fed from the sheet feeding cassette toward a sheet feed path at a predetermined time. The fed recording sheet P is nipped between two rollers of the registration roller pair 250 provided near an end of the sheet feed path. In the registration roller pair 250, the two rollers are driven to rotate to nip a leading end portion of the recording sheet P. Immediately thereafter, the rotational driving of the two rollers is stopped. Then, the rotational driving of the two rollers is restarted at a time causing the superimposed toner image on the intermediate transfer belt 206 to be superimposed on the recording sheet P in the secondary transfer nip. Due to the action of the above-described secondary transfer electric field, the toner images included in the superimposed toner image on the intermediate transfer belt 206 are secondary-transferred at the same time onto the recording sheet P nipped in the secondary transfer nip, and are formed into a full-color image with the white color of the recording sheet P. In the transfer unit 200, the secondary transfer roller 208 may be replaced by a transfer charger as the device for generating the secondary transfer electric field.

Above the secondary transfer nip, the fixing device 260 is provided which includes the fixing roller 261 including a heat generation source, such as a halogen lamp, and the pressure roller 262. The fixing device 260 brings the fixing roller 261 and the pressure roller 262 into contact with each other to form a fixing nip. The fixing roller 261 and the pressure roller 262 are driven to rotate such that the respective outer circumferential surfaces thereof move in the same direction in the fixing nip. The recording sheet P having passed the secondary transfer nip enters the fixing device 260 and is nipped in the fixing nip. Then, the full-color image is fixed on the recording sheet P with nip pressure and heat applied thereto.

A portion of the outer circumferential surface of the intermediate transfer belt 206 wound around the cleaning backup roller 202 is in contact with an edge of the cantilever-supported cleaning blade 210 of the belt cleaning device 207. Post-transfer residual toner and later-described tone patterns adhering to the outer circumferential surface of the intermediate transfer belt 206 having passed the secondary transfer nip are removed from the outer circumferential surface of the intermediate transfer belt 206 by the cleaning blade 210.

In a print operation using the present printer 1, the image information is first transmitted to the printer 1 by a printer driver of the not-illustrated PC. The printer 1 transmits the image information to the control unit 500 (see FIG. 5) and an image processing unit.

Upon receipt of the image information, the control unit 500 drives not-illustrated drive motors to rotate the intermediate transfer belt 206. At the same time, the photoconductors 101Y, 101C, 101M, and 101K of the respective image forming units 2Y, 2C, 2M, and 2K are driven to rotate. Further, the image processing unit transmits to the optical writing unit 290 optical writing signals generated on the basis of the image information. On the basis of the optical writing signals, the optical writing unit 290 generates the writing light Lb for each of the Y, C, M, and K colors, and optically scans the outer circumferential surfaces of the photoconductors 101Y, 101C, 101M, and 101K. Thereby, electrostatic latent images for the Y, C, M, and K colors are formed on the photoconductors 101Y, 101C, 101M, and 101K, and are visualized by the development devices 103Y, 103C, 103M, and 103K. Thereby, Y, C, M, and K toner images are formed on the photoconductors 101Y, 101C, 101M, and 101K. The Y, C, M, and K toner images are superimposed and primary-transferred onto the intermediate transfer belt 206 in the primary transfer nips for the Y, C, M, and K colors to be formed into a superimposed toner image.

Meanwhile, in the not-illustrated sheet feeding cassette, a sheet feed roller is driven to rotate and feeds the recording sheet P. The fed recording sheet P is separated from the other sheets of the sheet bundle by a not-illustrated separation roller, conveyed to the sheet feed path, and nipped by the registration roller pair 250. When the recording sheet P is set not in the sheet feeding cassette but in a not-illustrated manual feed tray, the recording sheet P set in the manual feed tray is fed by a not-illustrated sheet feed roller, separated from the other sheets of the sheet bundle by a not-illustrated separation roller, and conveyed to the registration roller pair 250.

The registration roller pair 250 conveys the recording sheet P toward the secondary transfer nip at a time causing the superimposed toner image formed on the intermediate transfer belt 206 to be superimposed on the recording sheet P. Although it is common to use the grounded registration roller pair 250, the registration roller pair 250 may be applied with a bias to remove paper powder of the recording sheet P.

The toner images included in the superimposed toner image on the intermediate transfer belt 206 are secondary-transferred at the same time onto the recording sheet P conveyed by the registration roller pair 250 and nipped in the secondary transfer nip. Thereafter, the recording sheet P passes the fixing device 260 and is discharged outside the printer 1. If the recording sheet P having a toner image fixed on one surface thereof is to have another image formed on the other surface thereof, the recording sheet P having passed the fixing device 260 is reversed by a not-illustrated switchback device and refed to the registration roller pair 250.

Figure 3:
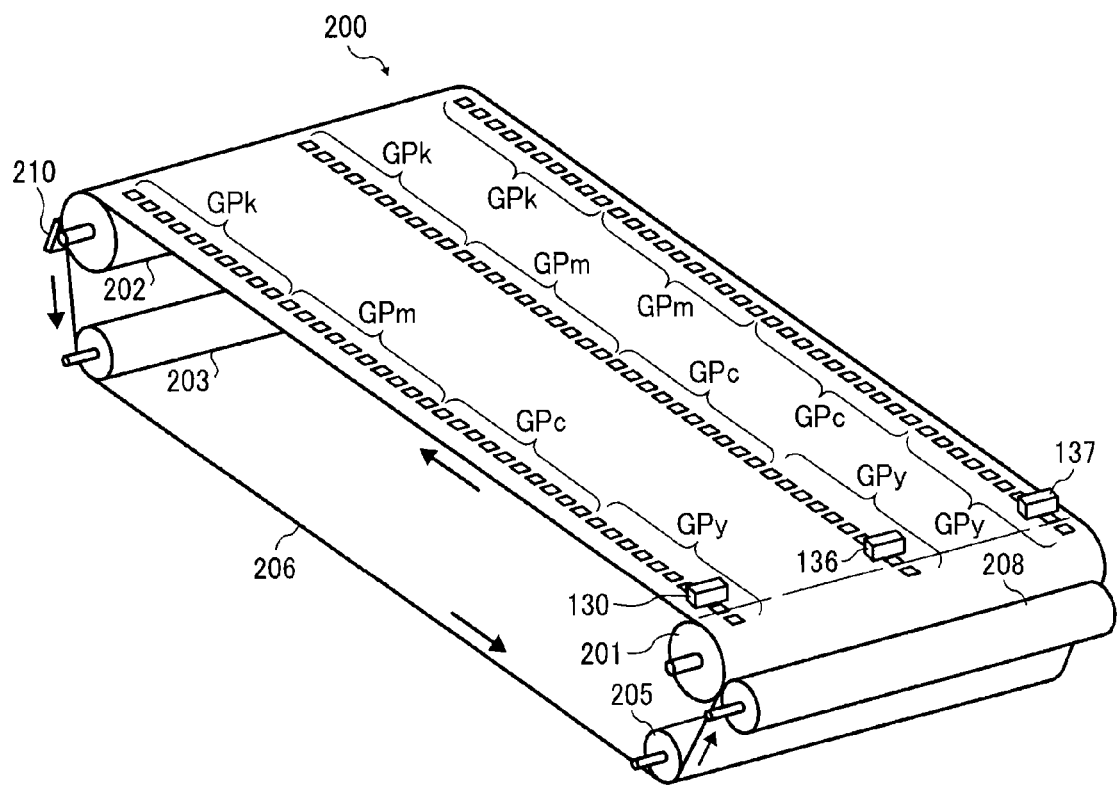
FIG. 3 is a perspective view illustrating a transfer unit of the printer.

FIG. 3 is a perspective view illustrating the transfer unit 200. The transfer unit 200 includes the first reflective optical sensor 130, the second reflective optical sensor 136, and the third reflective optical sensor 137 aligned in the width direction of the intermediate transfer belt 206 (hereinafter referred to as the belt width direction). The first to third reflective optical sensors 130, 136, and 137 are provided to face, via a predetermined gap, a portion of the outer circumferential surface of the intermediate transfer belt 206 wound around the drive roller 201 (hereinafter referred to as the wound portion). More specifically, the first reflective optical sensor 130 is provided to face a portion of the wound portion near one end of the wound portion in the belt width direction. The second reflective optical sensor 136 is provided to face the center of the wound portion in the belt width direction. The third reflective optical sensor 137 is provided to face a portion of the wound portion near the other end of the wound portion in the belt width direction. Each of the first to third reflective optical sensors 130, 136, and 137 detects a test toner image formed on the outer circumferential surface of the intermediate transfer belt 206 and the toner adhesion amount per unit area of the test toner image.

Figure 4:
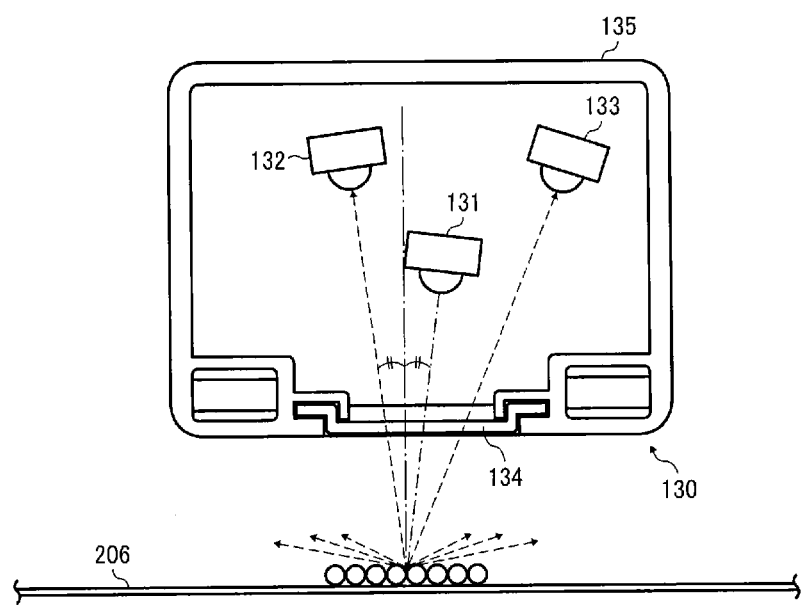
FIG. 4 is an enlarged configuration diagram illustrating an enlarged view of a first reflective optical sensor of the transfer unit.

FIG. 4 is an enlarged configuration diagram illustrating an enlarged view of the first reflective optical sensor 130. In FIG. 4, the first reflective optical sensor 130 includes an LED 131 serving as a light emitting device, a regular reflection light receiving device 132, a diffuse reflection light receiving device 133, a glass cap 134, and a casing 135. The LED 131 may be replaced by, for example, a laser light emitting device as the light emitting device. Each of the regular reflection light receiving device 132 and the diffuse reflection light receiving device 133 uses a phototransistor in the embodiment, but may be formed by a photodiode and an amplifier circuit, for example.

Infrared light emitted from the LED 131 passes through the glass cap 134 and reaches the test toner image formed on the intermediate transfer belt 206. Then, a portion of the infrared light is regularly reflected on a surface of the test toner image to be converted into regular reflection light, passes through the glass cap 134 again, and is received by the regular reflection light receiving device 132. The regular reflection light receiving device 132 outputs a voltage according to the amount of the received light. The output value is converted into digital data by a not-illustrated analog-to-digital (A/D) converter and input to the later-described control unit 500. Another portion of the infrared light is diffusedly reflected on the surface of the test toner image to be converted into diffuse reflection light, passes through the glass cap 134 again, and is received by the diffuse reflection light receiving device 133. The diffuse reflection light receiving device 133 outputs a voltage according to the amount of the received light. The output value is converted into digital data by the A/D converter and input to the control unit 500. On the basis of the respective voltages output from the regular reflection light receiving device 132 and the diffuse reflection light receiving device 133, the control unit 500 obtains information such as the time at which the test toner image formed on the outer circumferential surface of the intermediate transfer belt 206 has entered the area immediately under the first reflective optical sensor 130 and the toner adhesion amount per unit area of the test toner image.

The above description has been given of the first reflective optical sensor 130. The second reflective optical sensor 136 and the third reflective optical sensor 137 in FIG. 3 are similar in configuration to the first reflective optical sensor 130. Thus, description thereof will be omitted.

Figure 5:
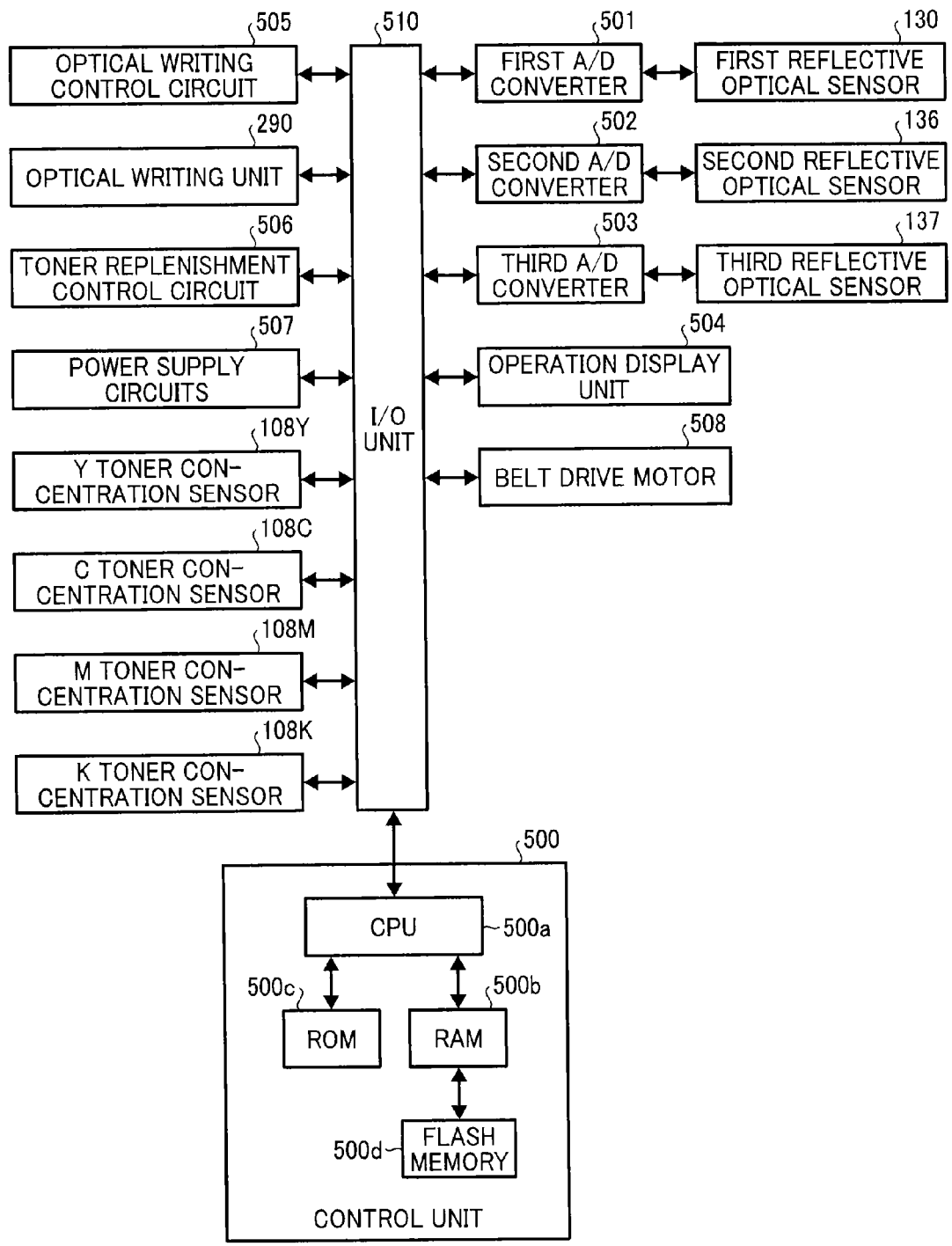
FIG. 5 is a block diagram illustrating a portion of an electrical circuit of the printer.

FIG. 5 is a block diagram illustrating a portion of an electrical circuit of the printer 1 according to the embodiment. In FIG. 5, the control unit 500 serving as an image forming condition adjustment device includes a central processing unit (CPU) 500a, a random access memory (RAM) 500b for temporarily storing a variety of data, a read-only memory (ROM) 500c for storing a control program and a variety of data, and a flash memory 500d for storing a variety of data in a nonvolatile manner. The control unit 500 is connected to a variety of peripheral devices via an input-output (I/O) unit 510 which relays signal transmission and reception between the control unit 500 and the peripheral devices. Although the control unit 500 is connected to the variety of peripheral devices via the I/O unit 510, FIG. 5 illustrates only major ones of the peripheral devices. An optical writing control unit 505 controls the driving of the optical writing unit 290. A toner replenishment control circuit 506 controls the driving of the not-illustrated toner replenishing devices which individually replenish the development devices 103Y, 103C, 103M, and 103K for the Y, C, M, and K colors with the respective toners in the toner bottles 90Y, 90C, 90M, and 90K for the respective colors. Power supply circuits 507 output, for example, the above-described biases including the primary transfer bias for the respective colors, the secondary transfer bias, and the development bias to be applied to the development sleeve 109 included in each of the development devices 103Y, 103C, 103M, and 103K for the respective colors. Each of the Y, C, M, and K toner concentration sensors 108Y, 108C, 108M, and 108K measures the toner concentration of the developer in the corresponding one of the development devices 103Y, 103C, 103M, and 103K for the respective colors. A first A/D converter 501 converts the value of the voltage output from the first reflective optical sensor 130 into digital data. A second A/D converter 502 converts the value of the voltage output from the second reflective optical sensor 136 into digital data. A third A/D converter 503 converts the value of the voltage output from the third reflective optical sensor 137 into digital data. A belt drive motor 508 serves as a drive source of the drive roller 201 and the intermediate transfer belt 206. An operation display unit 504 includes a display for displaying an image and a variety of keys for receiving information input by an operator.

The optical writing control circuit 505 controls the driving of the optical writing unit 290 on the basis of a control signal input from the control unit 500 via the I/O unit 510. The power supply circuits 507 control the output values of the biases to be output therefrom, on the basis of control signals input from the control unit 500 via the I/O unit 510.

The control unit 500 performs the following solid density stabilization process at a predetermined time, such as every time a predetermined time elapses and every time a predetermined number of sheet are printed. That is, solid tone patterns each including a plurality of solid toner images different from one another in toner adhesion amount per unit area are first formed on the photoconductors 101Y, 101C, 101M, and 101K for the Y, C, M, and K colors. In the formation of the solid toner images, the image forming condition, such as the uniformly charged potential of a photoconductor background area, the intensity of optical writing light, and the development bias, is set to be different among the solid toner images, and thereby the solid toner images are set to be different from one another in toner adhesion amount per unit area (hereinafter occasionally referred to simply as toner adhesion amount). In FIG. 3 described above, GPk denotes a K solid tone pattern formed with the K toner. The K solid tone pattern GPk includes ten K solid toner images aligned with a predetermined pitch in the moving direction of the intermediate transfer belt 206 (hereinafter referred to as the belt moving direction). Further, reference signs GPm, GPc, and GPy respectively denote an M solid tone pattern, a C solid tone pattern, and a Y solid tone pattern formed with the M toner, the C toner, and the Y toner, respectively. Each of the M, C, and Y solid tone patterns GPm, GPc, and GPy also includes ten solid toner images aligned with a predetermined pitch in the belt moving direction. The K solid tone pattern GPk, the M solid tone pattern GPm, the C solid tone pattern GPc, and the Y solid tone pattern GPy are continuously formed in this order from the upstream side toward the downstream side in the belt moving direction, to thereby form a tone pattern sequence. This tone pattern sequence including the solid tone patterns of four colors is formed at each of one end portion, a central portion, and the other end portion of the intermediate transfer belt 206 in the belt width direction.

In accordance with the movement of the intermediate transfer belt 206, the solid toner images of the tone pattern sequence formed at the one end portion of the intermediate transfer belt 206 in the belt width direction sequentially pass the area immediately under the first reflective optical sensor 130. During the passage, the control unit 500 obtains the respective toner adhesion amounts per unit area of the solid toner images. In a similar manner, the control unit 500 obtains the respective toner adhesion amounts per unit area of the solid toner images of the tone pattern sequence formed at the central portion of the intermediate transfer belt 206 in the belt width direction, while the solid toner images pass the area immediately under the second reflective optical sensor 136. Further, the control unit 500 obtains the respective toner adhesion amounts per unit area of the solid toner images of the tone pattern sequence formed at the other end portion of the intermediate transfer belt 206 in the belt width direction, while the solid toner images pass the area immediately under the third reflective optical sensor 137.

In the printer 1 according to the embodiment, the installation pitch of the four photoconductors 101Y, 101C, 101M, and 101K illustrated in FIG. 1 (hereinafter referred to as the primary transfer nip pitch) is set to approximately 110 mm. Meanwhile, each of the solid toner images of the tone pattern sequence is formed into a size having a length of approximately 7 mm in the belt moving direction and a length of approximately 5 mm in the belt width direction, and the distance between the rear end of a preceding solid toner image and the leading end of a subsequent solid toner image is set to approximately 4 mm. The length in the belt moving direction of the K solid tone pattern GPk is calculated as (7+4)×9+7, i.e., approximately 106 mm, which is less than the above-described primary transfer nip pitch. Therefore, even if two adjacent image forming units 2 simultaneously start forming the solid tone patterns, the solid tone patterns are not superimposed upon each other. For example, it is now assumed that the image forming unit 2K for the K color and the image forming unit 2M for the M color have simultaneously started forming the solid tone patterns. In this case, when the rear end of the K solid tone pattern GPk is primary-transferred from the photoconductor 101K for the K color onto the intermediate transfer belt 206 in the image forming unit 2K for the K color, the leading end of the M solid tone pattern GPm having been transferred from the photoconductor 101M for the M color onto the intermediate transfer belt 206 in the image forming unit 2M for the M color is located upstream of and separated from the rear end of the K solid tone pattern GPk by approximately 4 mm. Therefore, the rear end of the K solid tone pattern GPk is not superimposed on the leading end of the M solid tone pattern GPm. Similarly, the rear end of the M solid tone pattern GPm and the leading end of the C solid tone pattern GPc are not superimposed upon each other. Further, the rear end of the C solid tone pattern GPc and the leading end of the Y solid tone pattern GPy are not superimposed upon each other. It is therefore possible to simultaneously start forming the solid tone patterns of the respective colors. Further, as illustrated in FIG. 3, it is possible to form the tone pattern sequence such that adjacent solid tone patterns of the respective colors are aligned with a slight gap formed therebetween.

As described above, the distance between of the rear end of the preceding solid toner image and the leading end of the subsequent solid toner image is approximately 4 mm in the solid tone pattern. The printer 1 according to the embodiment performs the solid density stabilization process at a process linear velocity (i.e., linear velocity of the intermediate transfer belt 206 and the photoconductors 101Y, 101C, 101M, and 101K) of approximately 250 mm/sec. Thus, the time taken for the travel of approximately 4 mm is calculated as 4/250, i.e., approximately 0.016 seconds. The sum of the distance of approximately 4 mm and a distance of approximately 3.5 mm between the edge and the center of a solid toner image is approximately 7.5 mm. Thus, the time taken for the travel of approximately 7.5 mm is calculated as 7.5/250, i.e., approximately 0.03 seconds. As described above, the solid toner images of the solid tone pattern are formed under different development bias conditions. The time taken from a change in development bias condition to the stabilization of the development bias is more than the above-described time of approximately 0.016 seconds, but is less than approximately 0.03 seconds. The length and the interval of the solid toner images are set to maintain the above-described dimensional relationship. Thus, the length of the solid tone pattern is effectively reduced. Specifically, the toner adhesion amount in the edge of the solid toner image is larger than the original toner adhesion amount owing to the so-called edge effect. Therefore, the edge portion is not suitable as the area for detecting the toner adhesion amount. Even if the edge portion is formed under a stabilized bias condition, the edge portion is not suitable as the area for detecting the toner adhesion amount. It is therefore inefficient to start forming the edge portion after the stabilization of the bias condition. In view of this, the edge portion is formed before the stabilization to reduce the length of the solid toner image.

Having obtained the toner adhesion amounts of all solid toner images, the control unit 500 calculates a linear function expression of a development characteristic for each of the Y, C, M, and K colors. Specifically, on the basis of the respective toner adhesion amounts of the ten solid toner images of the solid tone pattern and the respective values of image forming development potential (i.e., difference between development bias and latent image potential) corresponding to the solid toner images, the control unit 500 calculates a linear function expression $y=ax+b$ of a development characteristic, which represents the relationship between the toner adhesion amount and the development potential. The control unit 500 calculates the linear function expression for each of the solid tone pattern formed at the one end portion of the intermediate transfer belt 206 in the belt width direction, the solid tone pattern formed at the central portion of the intermediate transfer belt 206 in the belt width direction, and the solid tone pattern formed at the other end portion of the intermediate transfer belt 206 in the belt width direction. Then, the control unit 500 calculates the mean value of the respective slopes a of the three obtained linear function expressions, and adjusts an image forming condition, such as the development potential, the intensity of optical writing laser light, and the toner concentration of the developer, on the basis of the calculation result. Detailed description of the adjustment is disclosed in, for example, Japanese Laid-Open Patent Application Publication No. 9-211911, and thus description thereof will be omitted. The above-described adjustment of the image forming condition is separately performed for each of the Y, C, M, and K colors.

Figure 6:
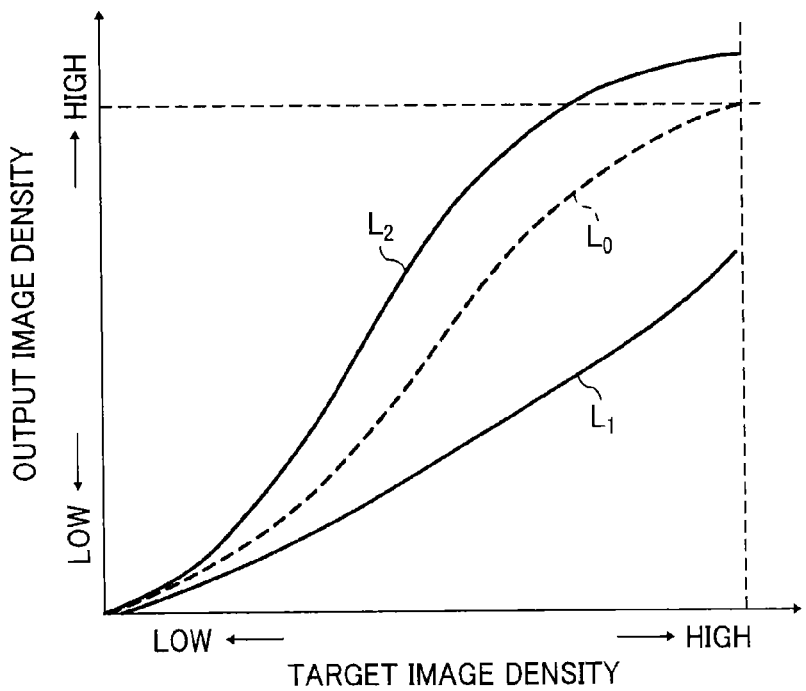
FIG. 6 is graphs illustrating a target image density characteristic curve and actual image density characteristic curves immediately before a solid density stabilization process.
Figure 7:
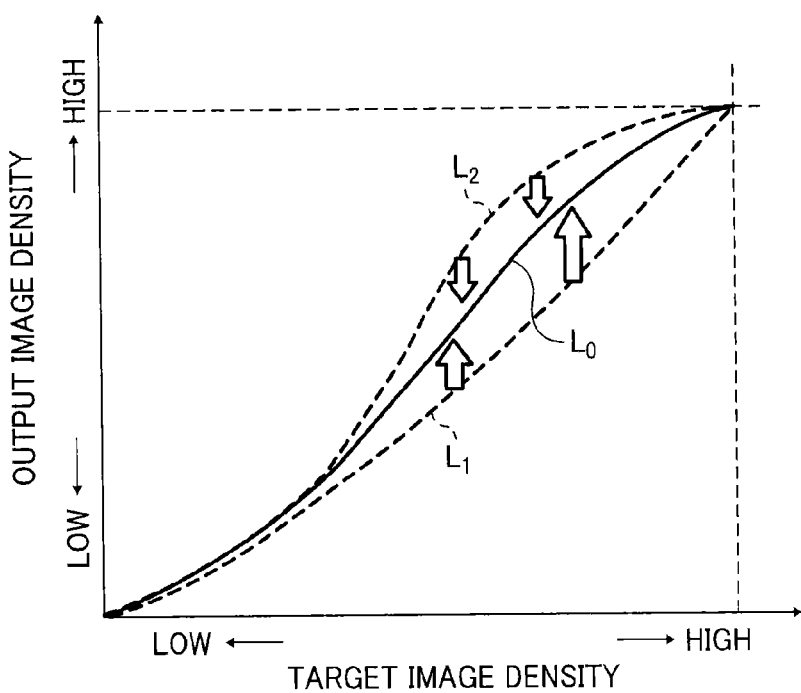
FIG. 7 is graphs illustrating a target image density characteristic curve and actual image density characteristic curves immediately after the solid density stabilization process.

FIG. 6 is graphs illustrating a target image density characteristic curve and actual image density characteristic curves immediately before the solid density stabilization process. An image density characteristic represents the relationship between the target value and the actual output value for each of different solid image densities. In an electrophotographic image forming apparatus, if there is a change in environment, such as temperature and humidity, or heat generation according to continuous operation, the actual image density characteristic curve deviates from the target image density characteristic curve, as illustrated in actual image density characteristic curves $L_1$ and $L_2$ relative to a target image density characteristic curve $L_0$. If such deviation is left uncorrected, it is difficult to correctly reproduce the solid image density. Therefore, the solid density stabilization process is performed. This process stabilizes the solid image density to the target image density by causing the image density characteristic curve having deviated from the target image density characteristic curve to approach the target image density characteristic curve, as in the actual image density characteristic curves $L_1$ and $L_2$ relative to the target image density characteristic curve $L_0$ illustrated in FIG. 7.

Figure 8:
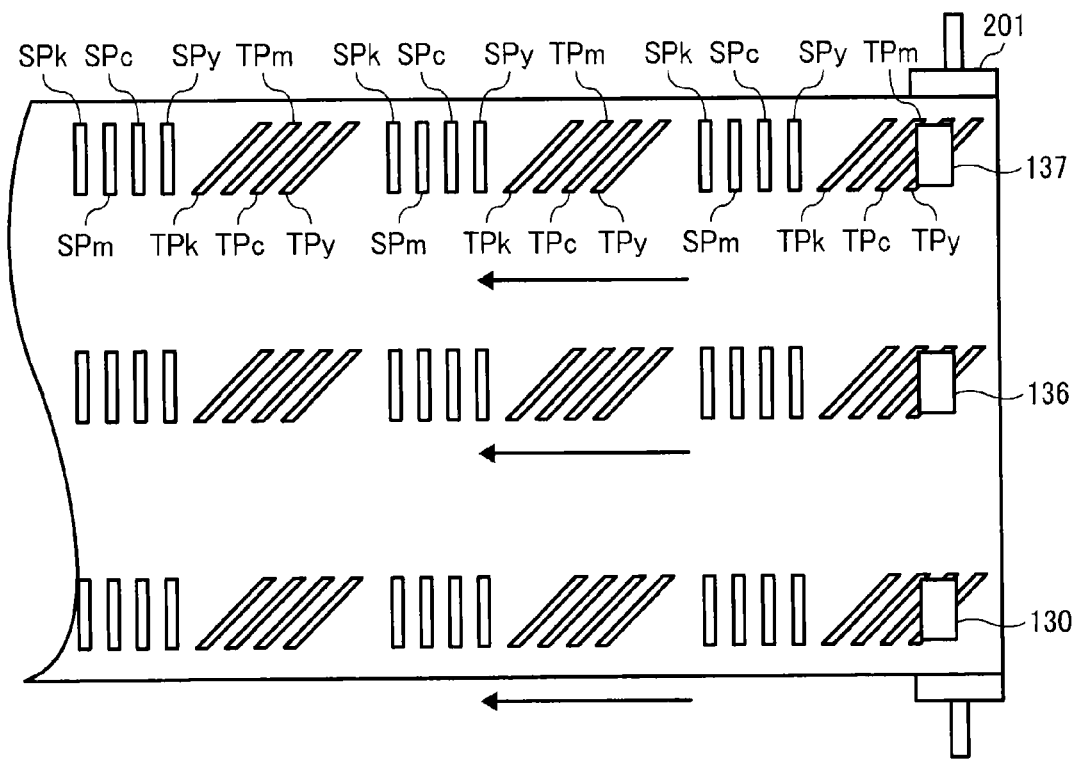
FIG. 8 is a partial plan view partially illustrating an intermediate transfer belt of the transfer unit together with misregistration detection patterns.

The control unit 500 is configured to perform a misregistration reduction process in addition to the above-described solid density stabilization process. In the misregistration reduction process, the control unit 500 forms a misregistration detection pattern as illustrated in FIG. 8 at each of the one end portion, the central portion, and the other end portion of the intermediate transfer belt 206 in the belt width direction. Each misregistration detection pattern includes eight chevron patch pattern groups aligned in the belt moving direction. FIG. 8 illustrates only three of the eight chevron patch pattern groups. Each of the chevron patch pattern groups includes four perpendicular patches extending in the belt width direction, i.e., a K perpendicular patch SPk, an M perpendicular patch SPm, a C perpendicular patch SPc, and a Y perpendicular patch SPy, and four oblique patches extending obliquely at an angle of approximately 45 degrees relative to the belt width direction, i.e., a K oblique patch TPk, an M oblique patch TPm, a C oblique patch TPc, and a Y oblique patch TPy.

The patches of the misregistration detection pattern formed at the one end portion of the intermediate transfer belt 206 in the belt width direction are detected by the first reflective optical sensor 130. The patches of the misregistration detection pattern formed at the central portion of the intermediate transfer belt 206 in the belt width direction are detected by the second reflective optical sensor 136. The patches of the misregistration detection pattern formed at the other end portion of the intermediate transfer belt 206 in the belt width direction are detected by the third reflective optical sensor 137. If each of the patches is formed at an appropriate time, detection time intervals of the patches are substantially equal. If each of the patches is formed at an inappropriate time, however, the detection time intervals of the patches are unequal. Further, if the optical system for optical writing has no skew, the patches of the same color are detected at the same time among the three misregistration detection patterns. If the optical system has a skew, however, the detection timing is different among the three misregistration detection patterns. On the basis of the difference in detection time interval or detection timing of the patches in the main scanning direction corresponding to the belt width direction and the sub-scanning direction corresponding to the belt moving direction, the control unit 500 performs an adjustment, such as the adjustment of the inclination of an optical mirror as an image forming condition and the correction of the optical writing timing as an image forming condition. With the above-described misregistration reduction process, misregistration of the superimposed images of the respective colors and an image skew are minimized.

The misregistration detection pattern including eight chevron patch pattern groups has a total length of approximately 284 mm in the belt moving direction. When the patterns are formed in the printer 1 according to the embodiment, the secondary transfer roller 208 illustrated in FIG. 3 is separated from the intermediate transfer belt 206 to prevent the patterns from being transferred onto the secondary transfer roller 208.

In the printer 1 according to the embodiment including the above-described basic configurations, the image forming units 2Y, 2C, 2M, and 2K for the respective colors, the optical writing unit 290, and so forth form an image forming device which forms the toner images on the photoconductors 101Y, 101C, 101M, and 101K for the respective colors serving as the image carrying members.

A configuration of the printer 1 according to the embodiment will now be described. The control unit 500 is configured to perform a halftone density stabilization process for stabilizing the image density of a halftone image for each of the Y, C, M, and K colors. In the halftone density stabilization process, halftone patterns each including a plurality of area coverage modulation toner images different from one another in image area ratio are first formed on the photoconductors 101Y, 101C, 101M, and 101K for the Y, C, M, and K colors. In the formation of the area coverage modulation toner images, the image area ratio is set to be different among the area coverage modulation toner images in accordance with a well-known dithering matrix, and thereby the area coverage modulation toner images are set to be different from one another in image density.

Figure 9:
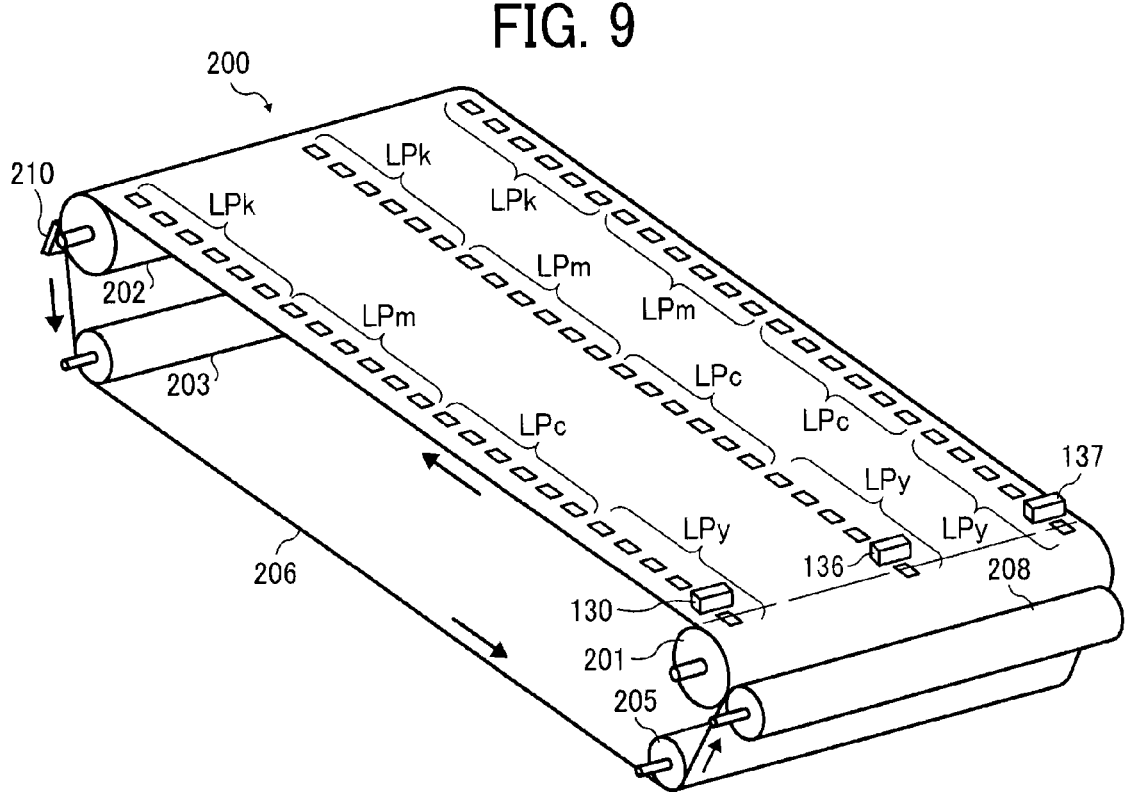
FIG. 9 is a perspective view illustrating the transfer unit in which halftone patterns of yellow, cyan, magenta, and black colors are formed on a surface of the intermediate transfer belt.

FIG. 9 is a perspective view illustrating the transfer unit 200, in which halftone patterns of the Y, C, M, and K colors are formed on the outer circumferential surface of the intermediate transfer belt 206. In FIG. 9, LPk denotes a K halftone pattern formed with the K toner. The K halftone pattern LPk includes six K area coverage modulation toner images aligned with a predetermined pitch in the belt moving direction. Further, LPm, LPc, and LPy respectively denote an M halftone pattern, a C halftone pattern, and a Y halftone pattern formed with the M toner, the C toner, and the Y toner, respectively. Each of the M, C, and Y halftone patterns LPm, LPc, LPy also includes six area coverage modulation toner images aligned with a predetermined pitch in the belt moving direction. Specifically, the six area coverage modulation toner images in each of the halftone patterns of the respective colors include first to sixth area coverage modulation toner images. The image density and the toner adhesion amount are increased from the first area coverage modulation toner image toward the sixth area coverage modulation toner image.

The K halftone pattern LPk, the M halftone pattern LPm, the C halftone pattern LPc, and the Y halftone pattern LPy are continuously formed in this order from the upstream side toward the downstream side in the belt moving direction, to thereby form a halftone pattern sequence. This halftone pattern sequence including the halftone patterns of four colors is formed at each of the one end portion, the central portion, and the other end portion of the intermediate transfer belt 206 in the belt width direction.

In accordance with the movement of the intermediate transfer belt 206, the area coverage modulation toner images of the halftone pattern sequence formed at the one end portion of the intermediate transfer belt 206 in the belt width direction sequentially pass the area immediately under the first reflective optical sensor 130. During the passage, the control unit 500 obtains the respective toner adhesion amounts per unit area of the area coverage modulation toner images. In a similar manner, the control unit 500 obtains the respective toner adhesion amounts per unit area of the area coverage modulation toner images of the halftone pattern sequence formed at the central portion of the intermediate transfer belt 206 in the belt width direction, while the area coverage modulation toner images pass the area immediately under the second reflective optical sensor 136. Further, the control unit 500 obtains the respective toner adhesion amounts per unit area of the area coverage modulation toner images of the halftone pattern sequence formed at the other end portion of the intermediate transfer belt 206 in the belt width direction, while the area coverage modulation toner images pass the area immediately under the third reflective optical sensor 137.

In the present embodiment, each of the area coverage modulation toner images of the halftone pattern sequence is formed into a size having a length of approximately 10 mm in the belt moving direction and a width of approximately 5 mm in the belt width direction, with the distance between the rear end of a preceding area coverage modulation toner image and the leading end of a subsequent area coverage modulation toner image set to approximately 7.68 mm. The length in the belt moving direction of the K halftone pattern LPk is calculated as (10+7.68)×5+10, i.e., approximately 98.4 mm, which is less than the above-described primary transfer nip pitch. Therefore, even if two adjacent image forming units 2 simultaneously start forming the halftone patterns, the halftone patterns do not overlap. For example, it is now assumed that the image forming unit 2K for the K color and the image forming unit 2M for the M color have simultaneously started forming the halftone patterns. In this case, when the rear end of the K halftone pattern LPk is primary-transferred from the photoconductor 101K for the K color onto the intermediate transfer belt 206 in the image forming unit 2K for the K color, the leading end of the M halftone pattern LPm having been transferred from the photoconductor 101M for the M color onto the intermediate transfer belt 206 in the image forming unit 2M for the M color is located upstream of and separated from the rear end of the K halftone pattern LPk by approximately 11.6 mm. Therefore, the rear end of the K halftone pattern LPk is not superimposed on the leading end of the M halftone pattern LPm. Similarly, the rear end of the M halftone pattern LPm and the leading end of the C halftone pattern LPc are not superimposed upon each other. Further, the rear end of the C halftone pattern LPc and the leading end of the Y halftone pattern LPy are not superimposed upon each other. It is therefore possible to simultaneously start forming the halftone patterns of the respective colors. Further, as illustrated in FIG. 9, it is possible to form the halftone pattern sequence such that adjacent halftone patterns of the respective colors are aligned with a slight gap formed therebetween.

The control unit 500 calculates, for each of the Y, C, M, and K colors, the mean value of the respective toner adhesion amounts of the six area coverage modulation toner images at the one end portion, the central portion, and the other end portion of the intermediate transfer belt 206 in the belt width direction. For example, in the case of the Y halftone pattern LPy, the control unit 500 adds up the respective toner adhesion amounts per unit area of the first area coverage modulation toner images formed at the one end portion, the central portion, and the other end portion of the intermediate transfer belt 206 in the belt width direction, and divides the sum by three to calculate the mean value. The control unit 500 similarly calculates the respective mean values of the second to sixth area coverage modulation toner images. Thereafter, the control unit 500 calculates the difference between the mean value of the toner adhesion amounts of the first area coverage modulation toner images and the target toner adhesion amount corresponding to the first area coverage modulation toner images, and corrects the image area ratio as an image forming condition of the first area coverage modulation toner images by a value corresponding to the difference. Similar correction is also performed for the second to sixth area coverage modulation toner images. The above-described correction of the image area ratio is also performed for the C, M, and K colors. Thereby, the halftone densities of the first to sixth area coverage modulation toner images are adjusted to respective target densities for each of the Y, C, M, and K colors.

The present inventors considered continuously performing this halftone density stabilization process and the solid density stabilization process and the misregistration reduction process described above. It is desirable that the halftone patterns of the halftone density stabilization process are desirable to be formed under image forming conditions, such as the development bias, that have been adjusted by the solid density stabilization process. Thus, the halftone density stabilization process is desired to be performed after the solid density stabilization process. The present inventors, therefore, first considered continuously performing the solid density stabilization process, the halftone density stabilization process, and the misregistration reduction process in this order. TABLE 1 given below illustrates the relationship between the steps of the initially performed solid density stabilization process and the time taken for each step.

TABLE 1

| Solid Density Stabilization Process | |
|---|---|
| Main steps | Time (sec.) |
| Start-up | 2.5 |
| Start of optical writing to start of transfer | 0.1708 |
| Travel from K nip to sensor | 0.66 |
| Detection of solid tone pattern sequences | 1.744 |
| Calculation | 0.5 |
| Total | 5.5748 |

In TABLE 1, "start-up" refers to the time taken from the start of driving of the intermediate transfer belt 206 to the stabilization of the velocity of the intermediate transfer belt 206, allowing optical writing on the photoconductors 101Y, 101C, 101M, and 101K. Further, "start of optical writing to start of transfer" refers to the time taken from the start of optical writing of the solid tone patterns on the photoconductors 101Y, 101C, 101M, and 101K for the respective colors to the arrival of the leading ends of electrostatic latent images formed by the optical writing to the respective centers in the belt moving direction of the primary transfer nips through the respective development positions in accordance with the rotation of the photoconductors 101Y, 101C, 101M, and 101K. In the printer 1 according to the embodiment, the process linear velocity, which corresponds to the linear velocity of the intermediate transfer belt 206 and the photoconductors 101Y, 101C, 101M, and 101K, is set to approximately 250 mm/sec. Further, the distance traveled from the entrance of the outer circumferential surfaces of the photoconductors 101Y, 101C, 101M, and 101K into respective optical writing positions to the entrance of the outer circumferential surfaces into the respective centers of the primary transfer nips in accordance with the rotation of the photoconductors 101Y, 101C, 101M, and 101K is approximately 42.7 mm. Therefore, the time taken from "start of optical writing to start of transfer" is calculated as 42.7/250, i.e., approximately 0.1708 seconds.

In TABLE 1, "travel from K nip to sensor" refers to the time taken from the transfer onto the intermediate transfer belt 206 of the leading ends of the K solid tone patterns GPk at the center in the belt moving direction of the primary transfer nip for the K color to the arrival of the leading ends to the center in the belt moving direction of the area immediately under the first to third reflective optical sensors 130, 136, and 137 (hereinafter referred to simply as the reflective optical sensors). The distance traveled by the intermediate transfer belt 206 from the center in the belt moving direction of the primary transfer nip for the K color to the center in the belt moving direction of the area immediately under the reflective optical sensors is approximately 165 mm. Therefore, the time taken for "travel from K nip to sensor" is calculated as 165/250, i.e., approximately 0.66 seconds.

In TABLE 1, "detection of solid tone pattern sequences" refers to the time taken from the start of detection by the reflective optical sensors of the leading ends of the solid tone pattern sequences having arrived at the center in the belt moving direction of the area immediately under the reflective optical sensors to the detection by the reflective optical sensors of the rear ends of the solid tone pattern sequences having arrived at the center. Each of the solid tone pattern sequences has a total length of approximately 436 mm in the belt moving direction. Thus, the time taken for "detection of solid tone pattern sequences" is calculated as 436/250, i.e., approximately 1.744 seconds.

In TABLE 1, "calculation" refers to the time taken for calculating, on the basis of the toner adhesion amounts of the solid toner images in the solid tone pattern sequences, the image forming condition providing the target solid image density. If the solid density stabilization process, the halftone density stabilization process, and the misregistration reduction process are continuously performed in this order, then the initially performed solid density stabilization process takes approximately 5.5748 seconds in all, as illustrated in TABLE 1.

TABLE 2 given below illustrates the relationship between the steps of the halftone density stabilization process performed subsequently to the solid density stabilization process and the time taken for each step.

TABLE 2

Halftone Density Stabilization Process

| Main steps | time (sec.) |
| --- | --- |
| Start of optical writing to start of transfer | 0.1708 |
| Travel from K nip to sensor | 0.66 |
| Detection of halftone pattern sequences | 1.72928 |
| Calculation | 0.5 |
| Total | 3.06008 |

In the halftone density stabilization process performed subsequently to the solid density stabilization process, the above-described "start-up" step is unnecessary. It is therefore possible to immediately start the optical writing on the photoconductors 101Y, 101C, 101M, and 101K. The halftone density stabilization process is the same as the solid density stabilization process in the time taken from "start of optical writing to start of transfer" and the time taken for "travel from K nip to sensor." The time taken for "detection of halftone pattern sequences" in TABLE 2 is slightly less than the time taken for "detection of solid tone pattern sequences" in TABLE 1. This is because the total length of the halftone pattern sequence is approximately 432.32 mm, which is slightly less than the total length of approximately 436 mm of the solid tone pattern sequence.

In TABLE 2, "calculation" refers to the time taken for calculating, on the basis of the toner adhesion amounts of the area coverage modulation toner images in the halftone pattern sequences, the image area ratio providing the target halftone density. The halftone density stabilization process following the solid density stabilization process takes a total time of approximately 3.06008 seconds in all, as illustrated in TABLE 2.

TABLE 3 given below illustrates the relationship between the steps of the misregistration reduction process performed subsequently to the halftone density stabilization process and the time taken for each step.

TABLE 3

Misregistration Reduction Process

| Main steps | Time (sec.) | Concurrent steps | Time (sec.) |
| --- | --- | --- | --- |
| Start of optical wiring to start of transfer | 0.1708 | | |
| Travel from Y nip to K nip | 1.32 | | |
| Travel from K nip to sensor | 0.66 | | |
| Detection of misregistration detection patterns | 1.136 | | |
| Shut-down | 2.5 | Calculation | 0.5 |
| Total | 5.7868 | | |

The misregistration reduction process is the same as the solid density stabilization process in the time taken from "start of optical writing to start of transfer" and the time taken for "travel from K nip and sensor." TABLE 3 includes a step of "travel from Y nip to K nip," which is absent in TABLES 1 and 2. Herein, "travel from Y nip to K nip" refers to the time taken for the leading end of a misregistration detection pattern forming area of the intermediate transfer belt 206 to travel from the center of the primary transfer nip for the Y color to the center of the primary transfer nip for the K color. This time is taken into account for the following reason. That is, in each of the solid tone pattern sequences, the solid tone patterns of the respective colors simultaneously start to be formed, as described above. Therefore, the time taken from the start of optical writing of the solid tone pattern sequences to the arrival of the leading ends of the solid tone pattern sequences to the area immediately under the reflective optical sensors corresponds to the sum of the time taken from "start of optical writing to start of transfer" and the time taken for "travel from K nip to sensor." Similarly, in each of the halftone pattern sequences, the halftone patterns of the respective colors simultaneously start to be formed. Therefore, the time taken from the start of optical writing of the halftone pattern sequences to the arrival of the leading ends of the halftone pattern sequences to the area immediately under the reflective optical sensors also corresponds to the sum of the time taken from "start of optical writing to start of transfer" and the time taken for "travel from K nip to sensor." Meanwhile, in each of the misregistration detection patterns, the respective colors are aligned not in units of patterns but in units of patches substantially short in length, unlike in the solid tone pattern sequence and the halftone pattern sequence. Thus, it is difficult to simultaneously start forming the patches of the respective colors. It is therefore desired to gradually start forming the patches in the order of Y, C, M, and K colors from the upstream side in the belt moving direction. The time taken for the leading end of the misregistration detection pattern forming area of the intermediate transfer belt 206 to travel from the center of the primary transfer nip for the Y color to the center of the primary transfer nip for the K color is calculated as 110×3/250, i.e., approximately 1.32 seconds, which corresponds to the time taken for "travel from Y nip to K nip."

In TABLE 3, "shut-down" refers to the time taken from the stop of driving of the belt drive motor 508 serving as the drive source of the intermediate transfer belt 206 to the complete stop of the intermediate transfer belt 206. Further, "calculation" refers to the time taken for calculating, on the basis of the detection timing of the patches in the misregistration detection patterns, the image forming condition, such as the optical writing start time, reducing the misregistration of the respective colors. The misregistration reduction process following the halftone density stabilization process takes a total time of approximately 5.7868 seconds in all, as illustrated in TABLE 3.

If the solid density stabilization process, the halftone density stabilization process, and the misregistration reduction process are continuously performed in this order, therefore, the total time taken from the start to the completion of the processes is calculated as 5.5748+3.06008+5.7868, i.e., approximately 14.42 seconds.

As to TABLES 2 and 3, "calculation" of TABLE 2 is not a mechanical operation, and thus is allowed to be performed concurrently with a mechanical operation of TABLE 3. Further, mechanical operations of "travel from Y nip to K nip" and "travel from K nip to sensor" of TABLE 3 are performed in accordance with the start of optical writing of the misregistration detection patterns upon completion of "calculation" of TABLE 2. If the formation of the misregistration detection patterns starts immediately after the completion of the formation of the halftone pattern sequences, i.e., before the completion of "calculation" of TABLE 2, to form the misregistration detection patterns immediately after the halftone pattern sequences, the steps of "travel from Y nip to K nip" and "travel from K nip to sensor" are not required.

In view of the above, the present inventors then considered starting the formation of the misregistration detection patterns immediately after the completion of the formation of the halftone pattern sequences to concurrently perform a late-stage step of TABLE 2 and an early-stage step of TABLE 3. TABLE 4 given below illustrates this configuration of the halftone density stabilization process and the misregistration reduction process.

TABLE 4

Halftone Density Stabilization Process and Misregistration Reduction Process

| Main steps | Time (sec.) | Concurrent Steps | Time (sec.) |
| --- | --- | --- | --- |
| Start of optical writing to start of transfer | 0.1708 | | |
| Travel from K nip to sensor | 0.66 | | |
| Detection of halftone pattern sequences | 1.72928 | | |
| Passage of inter-pattern gap | 0.2 | Calculation of halftone density stabilization | 0.2 |
| Detection of misregistration detection patterns | 1.136 | Calculation of halftone density stabilization | 0.3 |
| Shut-down | 2.5 | Calculation of misregistration reduction | 0.5 |
| Total | 6.39608 | | |

In this example, the halftone pattern sequence and the misregistration detection pattern are formed with a gap of approximately 50 mm formed between the rear end of the halftone pattern sequence and the leading end of the misregistration detection pattern. In TABLE 4, "passage of inter-pattern gap" refers to the time taken for the above-described gap to pass the area immediately under the reflective optical sensors, and is calculated as 50/250, i.e., approximately 0.2 seconds. The calculation of the halftone density stabilization process is performed concurrently with this step of "passage of inter-pattern gap," and lasts for approximately 0.2 seconds. The calculation of the halftone density stabilization process is also performed concurrently with an early-stage step of the misregistration reduction process after the start of detection of the misregistration detection pattern, and lasts for approximately 0.3 seconds.

When the late-stage step of the halftone density stabilization process and the early-stage step of the misregistration reduction process are concurrently performed, the total time taken for the two processes is approximately 6.39608, as illustrated in TABLE 4. The present configuration reduces the total time by approximately 2.5408 seconds, as compared with a configuration that continuously performs the two processes in a non-concurrent manner, which takes approximately 8.84688 seconds corresponding to the sum of the total time of TABLE 2 and the total time of TABLE 3.

If the configuration of TABLE 4 is employed, the steps of TABLE 4 are preceded by the steps of the solid density stabilization process in TABLE 1. The present inventors conceived of further reducing the necessary time by concurrently performing a late-stage step of the solid density stabilization process in TABLE 1 and an early-stage step of TABLE 4, similarly as in the reduction in necessary time due to concurrent performance of the late-stage step of the halftone density stabilization process in TABLE 2 and the early-stage step of the misregistration reduction process in TABLE 3, as illustrated in TABLE 4. However, it was found difficult to concurrently perform the late-stage step of TABLE 1 and the early-stage step of TABLE 4 because it is desirable to start forming the halftone pattern sequences immediately after the completion of the formation of the solid tone pattern sequences. Immediately after the completion of the formation of the solid tone pattern sequences, however, the detection of the solid tone pattern sequences and the calculation have not been completed, and thus the image forming condition, such as the development bias, have not been determined. It is therefore undesirable to start forming the halftone pattern sequences. Accordingly, it is desired to start the optical writing of the halftone pattern sequences after the completion of "calculation" of TABLE 1.

In view of the above, the present inventors considered changing the execution order of the three processes from the order of the solid density stabilization process, the halftone density stabilization process, and the misregistration reduction process to the order of the solid density stabilization process, the misregistration reduction process, and the halftone density stabilization process. This change is based on the following reason. That is, in a configuration having the misregistration reduction process inserted between the solid density stabilization process and the halftone density stabilization process, even if the halftone density stabilization process starts before the completion of the misregistration reduction process, the solid density stabilization process has reliably been completed by this time. This configuration, therefore, allows the halftone pattern sequences to be formed under image forming condition adjusted by the solid density stabilization process.

If the solid density stabilization process, the misregistration reduction process, and the halftone density stabilization process are sequentially performed in a continuous manner in which a subsequent process starts after the completion of a preceding process, the steps of the initially performed solid density stabilization process are the same as the steps of TABLE 1. The steps of the misregistration reduction process performed subsequently to the solid density stabilization process are illustrated in TABLE 5 given below.

TABLE 5

Misregistration Reduction Process

| Main steps | Time (second) |
|---|---|
| Start of optical writing to start of transfer | 0.1708 |
| Travel from Y nip to K nip | 1.32 |
| Travel from K nip to sensor | 0.66 |
| Detection of misregistration detection patterns | 1.136 |
| Calculation | 0.5 |
| Total | 3.7868 |

The steps of the halftone density stabilization process performed subsequently to the misregistration reduction process are illustrated in TABLE 6 given below.

TABLE 6

Halftone Density Stabilization Process

| Main steps | Time (sec.) | Concurrent steps | Time (sec.) |
|---|---|---|---|
| Start of optical writing to start of transfer | 0.1708 | | |
| Travel from K nip to sensor | 0.66 | | |
| Detection of halftone pattern sequences | 1.72928 | | |
| Shut-down | 2.5 | Calculation | 0.5 |
| Total | 5.06008 | | |

TABLE 7 given below illustrates a configuration of the misregistration reduction process and the halftone density stabilization process, which concurrently performs a late-stage step of the misregistration reduction process illustrated in TABLE 5 and an early-stage step of the halftone density stabilization process illustrated in TABLE 6.

TABLE 7

Misregistration Reduction Process and Halftone Density Stabilization Process

| Main steps | Time (sec.) | Concurrent steps | Time (sec.) |
|---|---|---|---|
| Start of optical writing to start of transfer | 0.1708 | | |
| Travel from Y nip to K nip | 1.32 | | |
| Travel from K nip to sensor | 0.66 | | |
| Detection of misregistration detection patterns | 1.136 | | |
| Passage of inter-pattern gap | 0.2 | Calculation of misregistration reduction | 0.2 |
| Detection of halftone pattern sequences | 1.72928 | Calculation of misregistration reduction | 0.3 |
| Shut-down | 2.5 | Calculation of halftone density stabilization | 0.5 |
| Total | 7.71608 | | |

In the configuration of TABLE 7, the calculation of the misregistration reduction process starts during "passage of inter-pattern gap," in which the gap of approximately 50 mm between the rear end of the misregistration detection pattern and the leading end of the halftone pattern sequence passes the area immediately under the reflective optical sensors. Thereafter, the detection of the halftone pattern sequences and the above-described calculation are concurrently performed. Then, upon completion of the detection of the halftone pattern sequences, the shut-down step and the calculation of the halftone density stabilization process are concurrently performed. The total necessary time of the present configuration is approximately 7.71608 seconds. Meanwhile, the total necessary time of a configuration that continuously performs the steps of TABLE 5 and the steps of TABLE 6 is calculated as 3.7868+5.06008, i.e., approximately 8.8488 seconds. The total necessary time of the present configuration is less than the total necessary time of the configuration continuously performing the steps of TABLE 5 and the steps of TABLE 6 by approximately 1.1308 seconds. That is, a configuration that continuously performs the steps of TABLE 1 and the steps of TABLE 7 takes approximately 13.29088 seconds, and reduces the necessary time by approximately 1.1308 second, as compared with a configuration that continuously performs the steps of TABLE 1, the steps of TABLE 5, and the steps of TABLE 6, which takes approximately 14.42168 seconds.

The present inventors then considered concurrently performing a late-stage step of the solid density stabilization process illustrated in TABLE 1 and an early-stage step of TABLE 7. Specifically, upon completion of the formation of the solid tone pattern sequences at a late stage of the solid density stabilization process, the process of TABLE 7 starts to start forming the misregistration detection patterns. There is no problem in starting the formation of the misregistration detection patterns with the above-described timing for the following reason. That is, each of the patches of the misregistration detection patterns serving as position detection toner images is for detecting a misregistration position. Therefore, the patches are not required to be formed with the target toner adhesion amount, and it suffices if the patches are formed under a predetermined image forming condition. It is therefore possible to start forming the misregistration detection patterns without waiting for the completion of the calculation of the solid density stabilization process. TABLE 8 given below illustrates a configuration that starts the process illustrated in TABLE 7 at the late stage of the solid density stabilization process illustrated in TABLE 1.

TABLE 8

Solid Density Stabilization Process, Misregistration Reduction Process, and Halftone Density Stabilization Process

| Main steps | Time (sec.) | Concurrent steps | Time (sec.) |
|---|---|---|---|
| Start-up | 2.5 | | |
| Start of optical writing to start of transfer | 0.1708 | | |
| Travel from K nip to sensor | 0.66 | | |
| Detection of solid tone pattern sequences | 1.744 | | |
| Passage of inter-pattern gap | 0.2 | Calculation of solid density stabilization | 0.2 |
| Detection of misregistration detection patterns | 1.136 | Calculation of solid density stabilization | 0.3 |
| Passage of inter-pattern gap | 0.2 | Calculation of misregistration reduction | 0.2 |

TABLE 8-continued

Solid Density Stabilization Process, Misregistration Reduction Process, and Halftone Density Stabilization Process

| Main steps | Time (sec.) | Concurrent steps | Time (sec.) |
|---|---|---|---|
| Detection of halftone pattern sequences | 1.72928 | Calculation of misregistration reduction | 0.3 |
| shut-down | 2.5 | calculation of halftone density stabilization | 0.5 |
| Total | 10.84008 | | |

According to the above-described configuration that concurrently performs the late-stage step of the solid density stabilization process and the early-stage step of the misregistration reduction process and concurrently performs the late-stage step of the misregistration reduction process and the early-stage step of the halftone density stabilization process, the total time taken for performing the three processes is reduced to approximately 10.84008 seconds. The present configuration substantially reduces the total necessary time, as compared with a configuration that continuously and separately performs the three processes. More specifically, the configuration sequentially performing the steps of TABLE 1, the steps of TABLE 2, and the steps of TABLE 3 and the configuration sequentially performing the steps of TABLE 1, the steps of TABLE 5, and the steps of TABLE 6 both take approximately 14.42 seconds, which is approximately 1.32 times of the necessary time taken for the steps of TABLE 8.

In the printer 1 according to the embodiment, therefore, the control unit 500 is configured to perform the three processes in a similar manner as in the steps of TABLE 8. This configuration substantially reduces the necessary time, as compared with the configuration that continuously and separately performs the three processes.

The reflective optical sensors are desired to be calibrated before being used. Specifically, the light reflection on the outer circumferential surface of the intermediate transfer belt 206 and the light emitting performance of the LED in each of the reflective optical sensors change over time. Simple supply of a constant amount of current to the LED, therefore, does not necessarily provide a stable reflected light amount in the background area of the intermediate transfer belt 206 (hereinafter referred to as the belt background area). To obtain a target reflected light amount in the belt background area, therefore, it is desired to regularly perform calibration for adjusting the supply current to the LED. However, the reflected light amount obtained in the belt background area does not abruptly change in a relatively short time period, such as a few hours. Therefore, the calibration of the reflective optical sensors may be performed once before the start of the steps of TABLE 8. Accordingly, there is no need to include a sensor calibration step in the process of TABLE 8, which completes in a substantially short time of slightly over ten seconds.

Further, the reflected light amount in the belt background area does not substantially change in a few hours. In the present printer 1, therefore, simplified calibration is performed, as the calibration of the reflective optical sensors preceding the steps of TABLE 8, during a few hours after the calibration of the reflective optical sensors performed upon power-on. In the simplified calibration, the difference between the received reflected light amount of the belt background area stored at the time of calibration performed upon power-on and the reflected light amount of the belt background area obtained in the simplified calibration is calculated, and the amount of the supply current to the LED is corrected by a value corresponding to the difference. The simplified calibration completes in a shorter time than the time taken for normal calibration. Thus, the preparation time before the steps of TABLE 8 is reduced.

Figure 10:
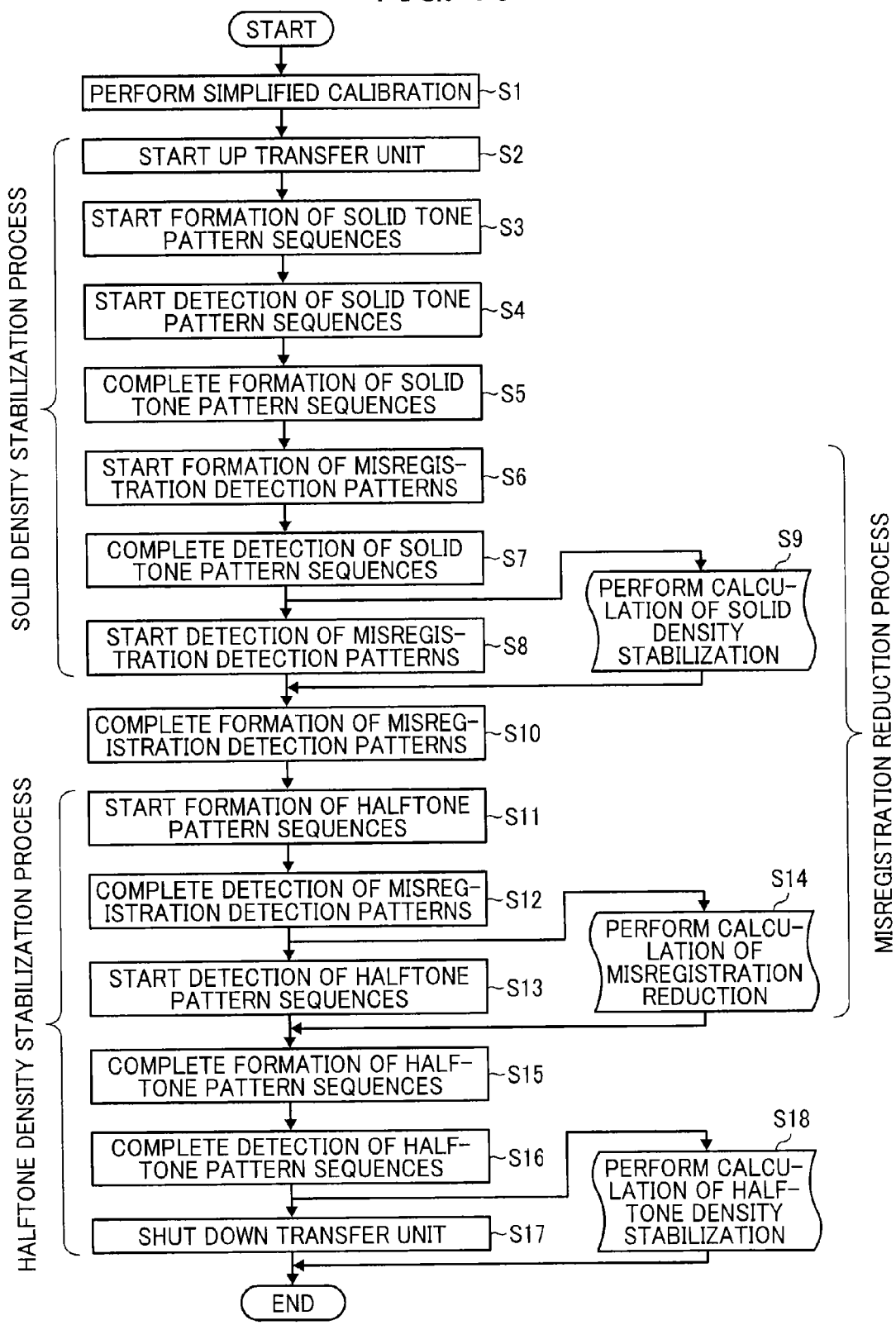
FIG. 10 is a flowchart illustrating steps of a control performed by a control unit of the printer.

FIG. 10 is a flowchart illustrating the steps of a control performed by the control unit 500. In the control, the control unit 500 performs the above-described simplified calibration (Step S1), and starts the solid density stabilization process. In the solid density stabilization process, the control unit 500 first starts driving the intermediate transfer belt 206 and so forth to start up the transfer unit 200 (Step S2), and starts the formation of the solid tone pattern sequences (Step S3). Then, the control unit 500 starts the detection of the solid tone pattern sequences (Step S4), and completes the formation of the solid tone pattern sequences (Step S5). At this time point, a portion of the intermediate transfer belt 206 preceding and separated from the rear ends of the solid tone pattern sequences by approximately 165 mm is located immediately under the reflective optical sensors. Thus, the detection of the solid tone pattern sequences continues to take place. Concurrently with the above-described detection, the control unit 500 starts the misregistration reduction process to start the formation of the misregistration detection patterns (Step S6). Upon completion of the detection of the solid tone pattern sequences (Step S7), the control unit 500 then starts the detection of the misregistration detection patterns (Step S8). Further, concurrently with this detection, the control unit 500 performs the calculation for determining the image forming condition for the solid density stabilization process (Step S9).

Thereafter, the control unit 500 completes the formation of the misregistration detection patterns (Step S10). Prior to this step, the control unit 500 has completed the solid density stabilization process by completing the above-described calculation (Step S9). Therefore, the control unit 500 starts the halftone density stabilization process immediately after the completion of the formation of the misregistration detection patterns (Step S10), and starts the formation of the halftone pattern sequences (Step S11). By this time, the adjustment value of the image forming condition according to the solid density stabilization process has been determined (Step S9). Therefore, the halftone pattern sequences are allowed to be formed under the above-described image forming condition.

The control unit 500 then completes the detection of the misregistration detection patterns (Step S12), and starts the detection of the halftone pattern sequences (Step S13). Further, concurrently with this detection, the control unit 500 performs the calculation for calculating the image forming condition, such as the timing of optical writing, reducing misregistration of the respective colors (Step S14). Then, the control unit 500 completes the formation of the halftone pattern sequences (Step S15). Prior to this step, the control unit 500 has completed the misregistration reduction process by completing the above-described calculation (Step S14). Thereafter, the control unit 500 completes the detection of the halftone pattern sequences (Step S16), and shuts down the transfer unit 200 by stopping the belt drive motor 508 and so forth (Step S17). Further, concurrently with the shut-down step, the control unit 500 performs the calculation for calculating the image area ratio providing the target halftone density (Step S18). Thereafter, the shut-down step is completed, and the sequence of process flow is completed.

As described above, in the printer 1 according to the embodiment, the control unit 500 serving as a processor is configured to perform the solid density stabilization process, the misregistration reduction process, and the halftone density stabilization process by driving the intermediate transfer belt 206 at the same process linear velocity of approximately 250 mm/sec. This configuration prevents inappropriate setting of the halftone image forming condition due to the performance of the halftone density stabilization process at a different process linear velocity from the process linear velocity for the solid density stabilization process. Specifically, even if the image forming condition, such as the development bias, is unchanged, a change in process linear velocity causes a change in, for example, development performance and thus a change in image forming performance. For example, therefore, the image forming condition determined by the solid density stabilization process performed at a process linear velocity A deviates from the appropriate image forming condition at a process linear velocity B. If the halftone density stabilization process is performed at the process linear velocity B under the thus determined image forming condition, regardless of the deviation, the halftone image forming condition deviating from the appropriate image forming condition is erroneously detected as appropriate. In view of this, the solid density stabilization process and the halftone density stabilization process are performed at the same process linear velocity.

Further, in the printer 1 according to the embodiment, the photoconductors 101Y, 101C, 101M, and 101K for the respective colors are provided with the equal pitch of approximately 110 mm. Further, the control unit 500 is configured to form each of the solid tone pattern sequences and the halftone pattern sequences in a length less than the above-described pitch. As described above, this configuration simultaneously starts forming the solid tone patterns of the respective colors, and thereby reduces the necessary time of the solid density stabilization process, as compared with a configuration that starts forming the solid tone patterns of the respective colors at different times. Further, this configuration simultaneously starts forming the halftone patterns of the respective colors, and thereby reduces the necessary time of the halftone density stabilization process, as compared with a configuration that starts forming the halftone patterns of the respective colors at different times.

Further, in the printer 1 according to the embodiment, the control unit 500 is configured to cause the reflective optical sensors serving as a toner image detector to detect the toner adhesion amounts per unit area of the solid toner images of the solid tone patterns and the toner adhesion amounts per unit area of the area coverage modulation toner images of the halftone patterns, with the operation condition of the reflective optical sensors, such as the supply current to the LED, set to be the same between the detection of the toner adhesion amounts of the solid toner images and the detection of the toner adhesion amounts of the area coverage modulation toner images. This configuration improves the detection accuracy of the toner adhesion amounts, as compared with a configuration that detects the toner adhesion amounts of the solid toner images and the toner adhesion amounts of the area coverage modulation toner images with different supply currents.

Further, in the printer 1 according to the embodiment, the control unit 500 is configured to set the supply current to the LED supplied in the detection of the patches of the misregistration detection patterns serving as the position detection toner images to be the same as the supply current to the LED supplied in the detection of the toner adhesion amounts per unit area of the solid toner images of the solid tone patterns and the detection of the toner adhesion amounts per unit area of the area coverage modulation toner images of the halftone patterns. This configuration also improves the detection accuracy of the toner adhesion amounts, as compared with a configuration that sets the supply current to the LED to be different among the above-described detections.

The above-described embodiments are illustrative and do not limit the present invention. Thus, numerous additional modifications and variations are possible in light of the above teachings. For example, elements or features of different illustrative and embodiments herein may be combined with or substituted for each other within the scope of this disclosure and the appended claims. Further, features of components of the embodiments, such as number, position, and shape, are not limited to those of the disclosed embodiments and thus may be set as preferred. It is therefore to be understood that, within the scope of the appended claims, the disclosure of the present invention may be practiced otherwise than as specifically described herein.

What is claimed is:

1. An image forming apparatus, comprising:
   an image forming device to form toner images;
   a plurality of image carrying members to carry the toner images formed on respective rotating surfaces thereof;
   a transfer device including an endless belt member, and configured to superimpose and transfer the toner images onto a rotating surface of the belt member and then onto a recording medium or superimpose and transfer the toner images onto a recording medium carried on the rotating surface of the belt member;
   a toner image detector to detect a toner image on the surface of the belt member and detect a toner adhesion amount per unit area of the toner image; and
   a processor that performs:
      a solid density stabilization process of forming solid tone patterns, each of which includes a plurality of solid toner images different from one another in toner adhesion amount per unit area, on the image carrying members, transferring the solid tone patterns onto the surface of the belt member, and adjusting, on the basis of the result of detection by the toner image detector of the toner adhesion amounts per unit area of the solid toner images included in each of the solid tone patterns, an image forming condition of the image forming device to form solid images on the image carrying members with respective target image densities;
      a misregistration reduction process of forming position detection toner images on the image carrying members, transferring the position detection toner images onto the surface of the belt member to obtain misregistration detection patterns, and adjusting, on the basis of the timing of detection by the toner image detector of the position detection toner images included in each of the misregistration detection patterns, an image forming condition of the image forming device to reduce relative misregistration of the toner images among the image carrying members; and
      a halftone density stabilization process of forming area coverage modulation toner images on the image carrying members, transferring the area coverage modulation toner images onto the surface of the belt member, and adjusting, on the basis of the result of detection by the toner image detector of the toner adhesion amounts per unit area of the area coverage modulation toner images, an image forming condition of the image forming device to form halftone images on the image carrying members with respective target image densities, the processor continuously performing the solid density stabilization process and the misregistration reduction process, and starting the halftone density stabilization process at a time at which the solid density stabilization process has been completed and the misregistration reduction process has not been completed, to thereby concurrently perform a step of the misregistration reduction process and at least a step of the halftone density stabilization process, wherein the processor performs the solid density stabilization process, the misregistration reduction process, and the halftone density stabilization process by driving the belt member at a same linear velocity.

2. The image forming apparatus according to claim 1, wherein the processor starts the misregistration reduction process before the completion of the solid density stabilization process to concurrently perform a step of the solid density stabilization process and a step of the misregistration reduction process.

3. The image forming apparatus according to claim 2, wherein:

when concurrently performing a step of the solid density stabilization process and a step of the misregistration reduction process, the processor continuously performs the formation of the solid tone patterns and the formation of the misregistration detection patterns, and when concurrently performing a step of the misregistration reduction process and at least a step of the halftone density stabilization process, the processor continuously performs the formation of the misregistration detection patterns and the formation of the area coverage modulation toner images.

4. The image forming apparatus according to claim 1, wherein:

the image carrying members are disposed at an equal pitch, and each of the solid tone patterns has a length less than the pitch in the moving direction of the belt member.

5. The image forming apparatus according to claim 4, wherein, in the halftone density stabilization process, the processor forms halftone patterns each including the area coverage modulation toner images different from one another in image area ratio, with each of the halftone patterns formed in a length less than the pitch in the moving direction of the belt member, and calculates, on the basis of the result of detection of the toner adhesion amounts per unit area of the area coverage modulation toner images, an image forming condition which adjusts a plurality of halftone density levels to respective target densities.

6. The image forming apparatus according to claim 1, wherein the processor causes the toner image detector to detect the toner adhesion amounts per unit area of the solid toner images of the solid tone patterns and the toner adhesion amounts per unit area of the area coverage modulation toner images under the same operation condition of the toner image detector.

7. The image forming apparatus according to claim 6, wherein the processor sets the operation condition of the toner image detector for detecting the position detection toner images of the misregistration detection patterns to be the same as the operation condition of the toner image detector for detecting the toner adhesion amounts per unit area of the solid toner images and the toner adhesion amounts per unit area of the area coverage modulation toner images.

8. An image forming method of forming toner images on respective rotating surfaces of a plurality of image carrying members and superimposing and transferring the toner images onto a rotating surface of an endless belt member and then onto a recording medium or superimposing and transferring the toner images onto a recording medium carried on the rotating surface of the belt member, the image forming method comprising:

performing a solid density stabilization process of forming solid tone patterns, each of which includes a plurality of solid toner images different from one another in toner adhesion amount per unit area, on the image carrying members, transferring the solid tone patterns onto the surface of the belt member, detecting toner adhesion amounts per unit area of the solid toner images included in each of the solid tone patterns, and adjusting, on the basis of the result of the detection, an image forming condition to form solid images on the image carrying members with respective target image densities;

performing a misregistration reduction process of forming position detection toner images on the image carrying members, transferring the position detection toner images onto the surface of the belt member to obtain misregistration detection patterns, detecting the position detection toner images included in each of the misregistration detection patterns, and adjusting, on the basis of the timing of the detection, an image forming condition to reduce relative misregistration of the toner images among the image carrying members, with the solid density stabilization process and the misregistration reduction process continuously performed; and performing a halftone density stabilization process of forming area coverage modulation toner images on the image carrying members, transferring the area coverage modulation toner images onto the surface of the belt member, detecting toner adhesion amounts per unit area of the area coverage modulation toner images, and adjusting, on the basis of the result of the detection, an image forming condition to form halftone images on the image carrying members with respective target image densities, with the halftone density stabilization process started at a time at which the solid density stabilization process has been completed and the misregistration reduction process has not been completed, to thereby concurrently perform a step of the misregistration reduction process and at least a step of the halftone density stabilization process, wherein the steps of performing the solid density stabilization process, performing the misregistration reduction process, and performing the halftone density stabilization process are performed by driving the belt member at a same linear velocity.

* * * * *